(12) United States Patent
Ye et al.

(10) Patent No.: US 7,689,651 B2
(45) Date of Patent: Mar. 30, 2010

(54) ENTERPRISE SYSTEM HAVING A SMART DISTANCE AMONG ARTIFACTS, AND APPARATUS AND METHOD FOR PROVIDING THE SMART DISTANCE AMONG THE ARTIFACTS

(75) Inventors: Yiming Ye, White Plains, NY (US); Haiyang Wang, legal representative, White Plains, NY (US); Jen-Yao Chung, Yorktown Heights, NY (US); David Cohn, Dobbs Ferry, NY (US); Fenno F. Heath, III, Woodbridge, CT (US); Jun-Jang Jeng, Armonk, NY (US); Santhosh Kumaran, Croton On Hudson, NY (US); Hui Lei, Scarsdale, NY (US); Prabir Nandi, Bayside, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/277,074

(22) Filed: Nov. 24, 2008

(65) Prior Publication Data

US 2009/0083108 A1 Mar. 26, 2009

Related U.S. Application Data

(63) Continuation of application No. 10/673,340, filed on Sep. 30, 2003, now Pat. No. 7,461,125.

(51) Int. Cl.
*G06F 9/44* (2006.01)
*G06F 9/46* (2006.01)
*G06F 15/16* (2006.01)
*G06F 17/50* (2006.01)
*G06F 15/173* (2006.01)
*G05B 19/418* (2006.01)

(52) U.S. Cl. ............... 709/204; 709/223; 709/224; 705/7; 705/8

(58) Field of Classification Search .......... 709/204, 709/223, 224; 705/7, 8
See application file for complete search history.

(56) References Cited

U.S. PATENT DOCUMENTS

| 7,028,074 | B2 | 4/2006 | Ye et al. | |
| 7,461,125 | B2 * | 12/2008 | Wang et al. | 709/204 |
| 2002/0038217 | A1 | 3/2002 | Young | |
| 2002/0042735 | A1 | 4/2002 | Narahara et al. | |
| 2003/0014314 | A1 | 1/2003 | Griep et al. | |
| 2003/0033179 | A1 | 2/2003 | Katz et al. | |
| 2004/0044557 | A1 | 3/2004 | Frech et al. | |
| 2005/0086303 | A1 * | 4/2005 | Ye et al. | 709/205 |

OTHER PUBLICATIONS

Ye, et al., Agents-Supported Adaptive Group Awareness: Smart Distance and WWWaware, 12 pages.

* cited by examiner

*Primary Examiner*—Ronald D Hartman, Jr.
(74) *Attorney, Agent, or Firm*—Derek S. Jennings; McGinn IP Law Group, PLLC

(57) ABSTRACT

An enterprise system includes a plurality of artifacts (e.g., persons, objects, databases, autonomous elements, intelligent agents, information systems, etc), and a smart distance (e.g., a distance which may optimize the performance of the enterprise system) between the plurality of artifacts.

17 Claims, 24 Drawing Sheets

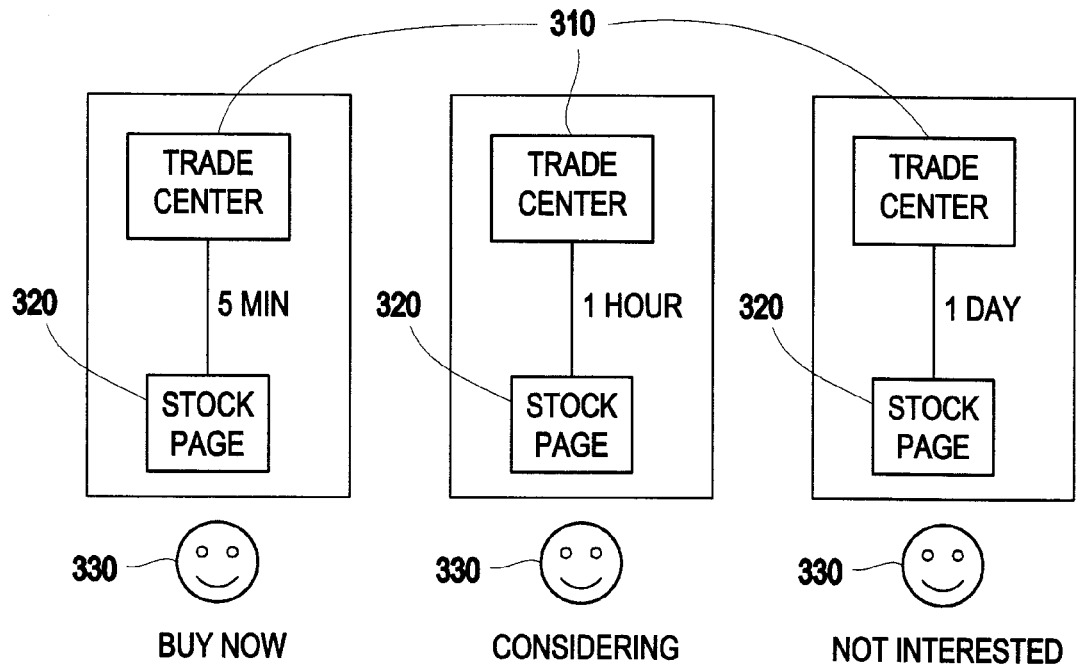
FIG.3
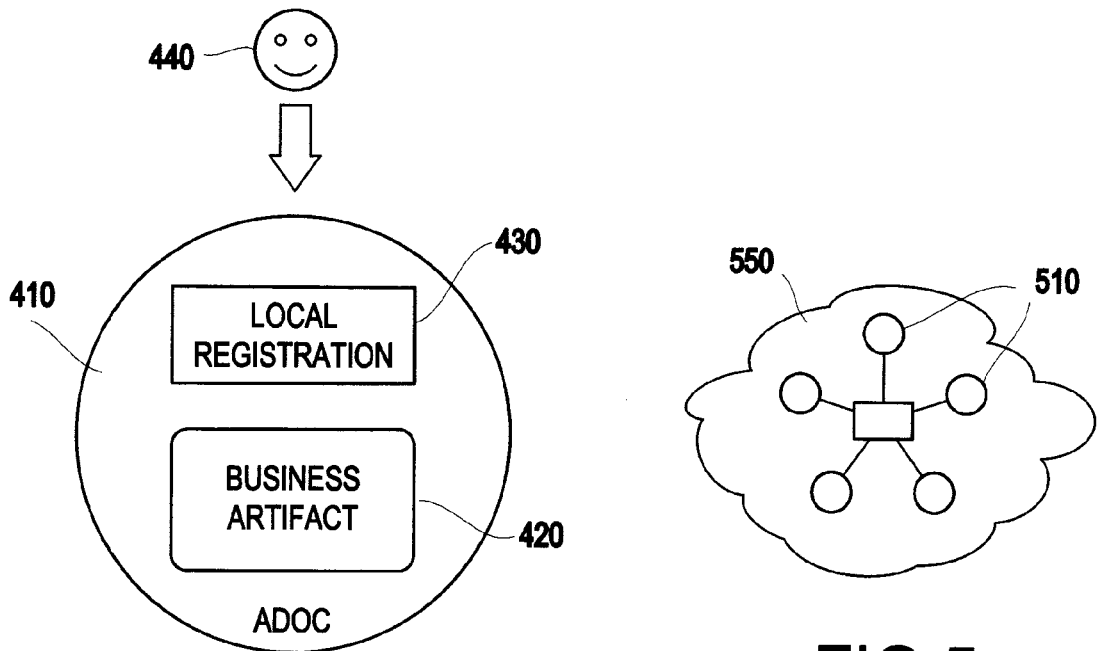
FIG.4
FIG.5

FIG.21

ENTERPRISE SYSTEM HAVING A SMART DISTANCE AMONG ARTIFACTS, AND APPARATUS AND METHOD FOR PROVIDING THE SMART DISTANCE AMONG THE ARTIFACTS

RELATED APPLICATIONS

This application is a Continuation application of U.S. patent application Ser. No. 10/673,340 filed on Sep. 30, 2003 now U.S. Pat. No. 7,461,125.

BACKGROUND OF THE INVENTION

1. Field of the Invention

The present invention relates to an enterprise system having a plurality of artifacts, and in particular, to an enterprise system having a "smart distance" between the plurality of artifacts, and an apparatus and method for providing the "smart distance" among the artifacts.

2. Description of the Related Art

The pervasive connectivity of the Internet, coupled with an increasing distribution of organizations, are introducing profound changes in the way enterprises are set up and operated and are intensifying the forces within and across enterprises. To remain competitive in this environment, organizations need to move fast and quickly adapt to business-induced changes. An organization must be able to sense the salient information, transform it into meaningful, quality business metrics, respond by driving the execution of business decisions into operational systems, and finally track the results against actions and expectations.

In parallel with this trend, there have been interesting developments in the fields of Intelligent Agents and Distributed Artificial Intelligence (DAI), notably in the concepts, theories and deployment of intelligent agents as a means of distributing computer-based problem solving expertise. Intelligent agents are well suited to the emerging character of the adaptive enterprise in which the distributed operations must be orchestrated into a synchronous flow.

There have been arguments or efforts to use agents or business objects to construct adaptive systems or enterprises. For example, one such effort addresses the issue of how to build agents that function effectively in "adaptive intelligent systems" (AISs) that vary dynamically along dimensions like task requirements, different resources, contextual conditions, and performance criteria. In that effort, it was argued that an agent must adapt several key aspects of its behavior to dynamic situations such as its perceptual strategy, its control mode, its choices of reasoning tasks to perform, its choices of reasoning methods for performing those tasks, and its meta-control strategy for global coordination of all of its behavior.

However, the state of the art of artificial intelligence has not reached to a stage such that an adaptive system can be operated effectively without the involvement of human beings. Therefore, despite various efforts in studying object-oriented or agent-oriented adaptive enterprises, there are no working systems being widely used in practice.

SUMMARY OF THE INVENTION

In view of the foregoing and other exemplary problems, disadvantages, and drawbacks of the aforementioned systems and methods, it is a purpose of the present invention to provide an enterprise system having a distance between artifacts which allows the performance of the system to be maximized.

It should be noted that the term "distance" as used in the present application may be understood as referring to the various degrees of awareness, communications, and interactions among different artifacts.

An exemplary aspect of the present invention includes an enterprise system (e.g., a virtual enterprise system) which includes a plurality of artifacts (e.g., persons, objects, databases, autonomous elements, intelligent agents, information systems, etc), and a "smart distance" (e.g., a distance which may maximize the performance of the enterprise system) between the plurality of artifacts. Specifically, the smart distance may include an optimal degree of awareness, communication and interaction between artifacts in the plurality of artifacts.

Further, a plurality of interactions may be formed between artifacts in the plurality of artifacts. The interactions may include different channels, including, for example, a video channel, an audio channel and a text channel.

The inventive system may further include a calculator for calculating the smart distance among artifacts according to a predetermined algorithm which includes representing a distance from $a_i$ to $a_j$ as a vector $d_{ij} = \langle |c_1|, \ldots, |c_{I_{ij}}| \rangle$, representing the distance configurations at time $\tau$ for a given enterprise by a matrix $$D(\tau) = \begin{pmatrix} d_{11}(\tau), \ldots, d_{1n}(\tau) \\ \ldots \\ d_{n1}(\tau), \ldots, d_{nn}(\tau) \end{pmatrix},$$

and minimizing $\|D(\tau) - D_{natural}(\Omega(\tau))\|$, where an interaction between the artifacts comprises channels $c_1, \ldots c_{I_{ij}}$, $|c_{I_{ij}}|$ comprises the degree of interaction for channel $c_{I_{ij}}$, $\Omega(\tau)$ comprises a given contextual/environmental condition at time $\tau$, and $D_{natural}(\Omega(\tau))$ comprises a natural distance configuration.

Another exemplary aspect of the present invention includes an apparatus for providing a smart distance among artifacts of an enterprise system. The apparatus includes at least one processing device (e.g., host computer) for determining a smart distance using contextual information captured by a state machine, and a smart distance preference as recorded by a local registry. Each smart distance may be determined relative to other smart distances in the enterprise system.

The smart distance may include one of an adaptive smart distance and an on-demand smart distance. Further, the processing device may introduce a smart distance into the enterprise system.

In addition, an adaptive document (Adoc) may used to implement the smart distance. The apparatus may also include an input device for inputting a smart distance requirement into different artifacts in the enterprise system. Further, a best interaction configuration may be negotiated and selected at any time and under any contextual situation, to facilitate post-editing (e.g., without modifying original code to change an interaction strategy).

Further, the apparatus may be operable in a changing environment and may be just-in-time adaptable. In addition, the apparatus may include an on-demand system which is derived from a transformed traditional information system. The apparatus may also enable a flexible range of interactions (e.g., between artifacts) and a selection of the interactions. For example, the user may select a type (e.g., distance, manner, etc.) of interaction between artifacts. The smart distance may also be standardized such that the apparatus is operable across a plurality of enterprise systems.

In another exemplary aspect, the present invention includes a method for providing a smart distance among artifacts of an enterprise system. The inventive method includes providing a plurality of artifacts, and calculating a smart distance between the plurality of artifacts. For example, the inventive method may calculate the smart distance according to the above-mentioned predetermined algorithm.

Another exemplary aspect of the present invention includes a virtual enterprise system which includes at least one processing device for determining a smart distance between artifacts using contextual information and a smart distance preference, the smart distance being determined relative to other smart distances between artifacts in the enterprise system. The system may further include a state machine operatively coupled to the at least one processing device, for capturing the contextual information, and a local registry operatively coupled to the at least one processing device, for recording the smart distance preference.

Another exemplary aspect of the present invention includes a virtual enterprise system for engineering and construction (E&C) resource management. For example, the system may control resource acquisition and procurement and resource allocation and scheduling, optimally manage a supply chain including changes from various unexpected events, control and optimize distributed resources at both individual project level and global level, and manage risk.

In another exemplary aspect, the present invention includes a programmable storage medium tangibly embodying a program of machine-readable instructions executable by a digital processing apparatus to perform the inventive method.

In another exemplary aspect, the present invention includes a method for deploying computing infrastructure in which computer-readable code is integrated into a computing system, such that the code and the computing system combine to perform the inventive method.

With its unique and novel features, the present invention provides an enterprise system having a distance between artifacts which allows the performance of the system to be maximized.

BRIEF DESCRIPTION OF THE DRAWINGS

The foregoing and other exemplary features, aspects and advantages will be better understood from the following detailed description of the exemplary embodiments of the invention with reference to the drawings, in which:

FIG. 3 illustrates an exemplary distance configuration;

FIG. 4 illustrates an adaptive document (Adoc) as a smart distance enabler according to the exemplary aspects of the present invention;

FIG. 5 illustrates artifacts in an enterprise system according to the exemplary aspects of the present invention;

FIG. 21 illustrates an example of a portal 2100 of the "sense and respond" system that may be benefited from BESA agents, according to an exemplary aspect of the present invention;

DETAILED DESCRIPTION OF THE EXEMPLARY EMBODIMENTS OF THE INVENTION

Figure 1:
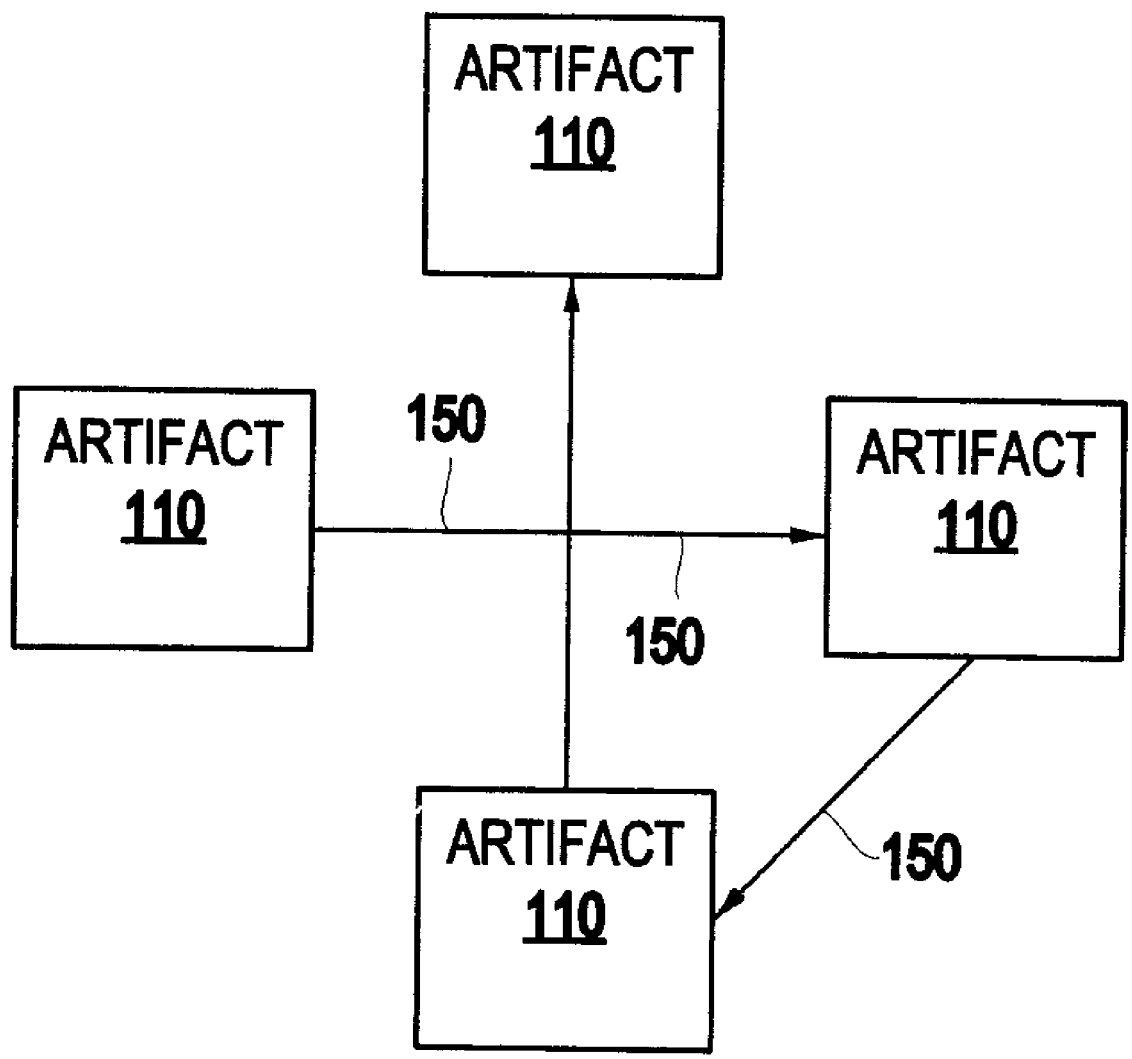
FIG. 1 illustrates an enterprise system 100 according to an exemplary aspect of the present invention.

Referring now to the drawings, FIG. 1 illustrates an enterprise system 100 having a smart distance between artifacts, according to an exemplary aspect of the present invention.

As shown in FIG. 1, the inventive system 100 includes a plurality of artifacts 110; and a smart distance 150 between the plurality of artifacts 110. Specifically, the inventive enterprise system 100 may include a virtual enterprise system. Thus, the inventive system 100 may implemented using a plurality of computers connected together on a network (e.g., LAN, WAN, Internet).

The present invention also includes a method and apparatus for providing smart distance among artifacts of an enterprise system. Specifically, the present invention may use an adaptive Document (e.g., Adoc) as a core media for the construction of a smart distance enabled system (e.g., an on-demand enterprise).

There exist several key business problem areas which the present invention may be used to address. First, effective interaction among system artifacts (e.g., business objects, database systems, humans, etc.) can be a problem area. Second, interaction generally can be a problem area, specifically in the areas of awareness, tracking and monitoring, as well as activating and influencing, and interacting which follows a predefined protocol.

Another problem area is the adaptive information system. Specifically, adapting to contextual changes and task changes can be a problem. Further, the cross enterprise information system can also be a problem area.

The current state of the art includes interaction enabled by communication/messaging (e.g., within language (parameter passing) TCP/IP, etc.). However, the range of interaction is limited. For example, it is hard coded and requires substantial effort. Further, it can be quite complex to implement, and must be re-coded when the interaction strategies change (e.g., CP).

Thus, conventional methods are not suitable to a fast changing environment. For example, such methods are not able to predicate/enlist all the future context situations in design phase. Further, any necessary re-design will be time consuming, wrought with errors, and require a huge effort. In addition, it is difficult to adapt to task changes.

The present invention uses the concept of "smart distance" to improve an enterprise. The invention may deal with person-to-person interaction. In that case, the two persons involved may want to adjust the distance to set it at an optimal distance (e.g., a smart distance) between them depending upon the context.

The invention may also deal with person-to-object interaction. For example, a person reading a book may want to adjust the distance between himself and the book, depending on the ambient lighting, his eyesight, etc. Specifically, the present invention deals with artifact-to-artifact interaction. The invention involves the natural distance between the artifacts, the real distance between the artifacts, and the smart distance between the artifacts.

A smart distance may include the set of possible interactions between two artifacts. For example, a smart distance may involve awareness channels, activation (effects) channels, and different interaction policies. According to "smart distance", the best distance is chosen for a given context.

Figure 2A:
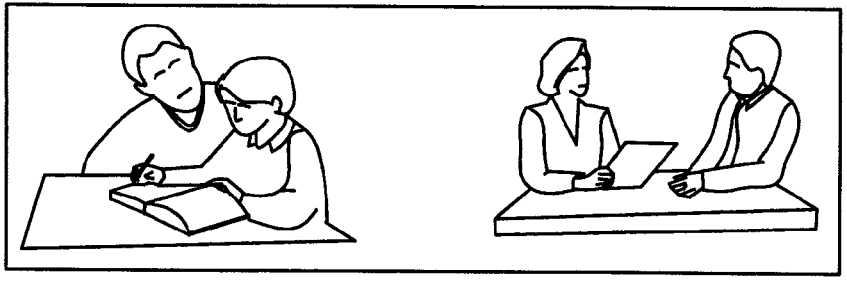
FIGS. 2A-2E illustrate the smart distance concept according to an exemplary aspect of the present invention.
Figure 2B:
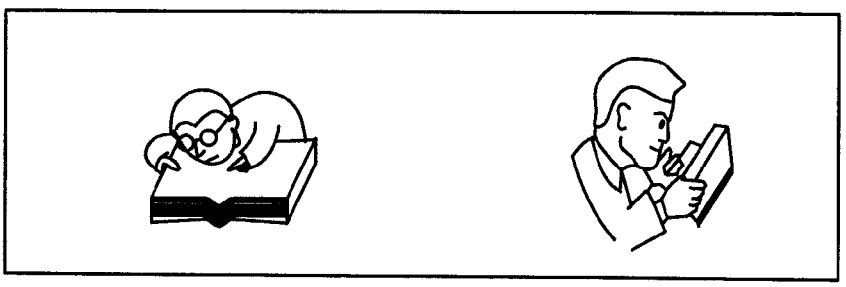

The smart distance concept can be intuitively represented in FIGS. 2A-2E. A smart distance between people refers to the situation where people intelligently adjust their distance based on various social contexts and preferences (e.g., see FIG. 2A). FIG. 2B shows the concept of a "smart distance" between a person and an object. The person in the figure adjusts the distance between his eyes and the books under different contexts and vision conditions.

Figure 2C:
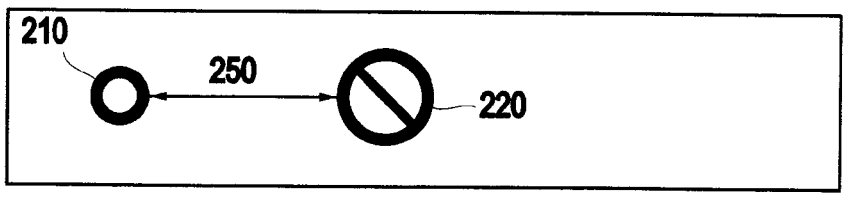
Figure 2D:
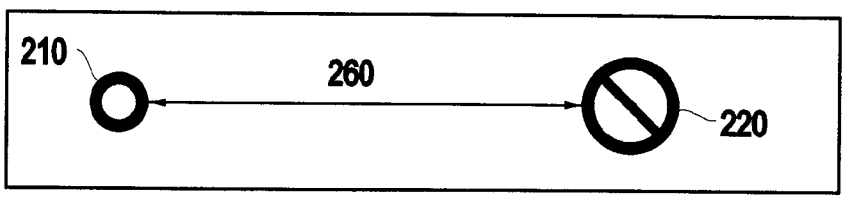
Figure 2E:
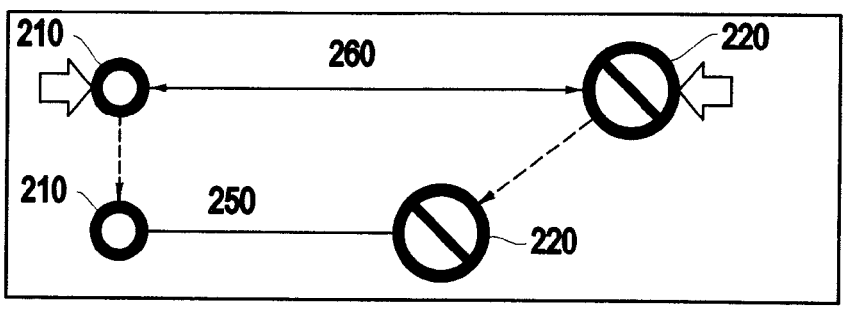

Further, FIG. 2C shows the natural distance 250, or the best distance between two artifacts 210, 220 under a contextual situation at a given time. FIG. 2D shows the real distance 260 between the two artifacts 210, 220, which may not be the natural distance. FIG. 2E shows the situation that the two artifacts 210, 220 perform some autonomous actions such that their distance from each other can be the same as their natural distance 250.

The present invention may further include a frustration energy/matrix. Specifically, the present invention may be physics-based, and may include multiple artifact negotiation.

For example, FIG. 3 shows a exemplary distance configuration for a system including a Trade Center 310, a Stock Page 320 and a customer 330. As shown in FIG. 3, where the distance configuration is defined by 5 minutes the customer 330 may have a "Buy Now" attitude, if the distance configuration is defined by 1 hour, the customer may have a "Considering" attitude, but if the distance configuration is defined by 1 day, the customer is no longer interested in the transaction.

In an exemplary embodiment, the present invention may utilize an adaptive document (Adoc) as a smart distance enabler. For example, as illustrated in FIG. 4, in the present invention an Adoc 410 may be used to wrap business objects 420. Further, contextual information may be captured by state machines. In addition, a smart distance preference may be recorded by local registration 430. For example, the preference may include at what state to activate which channel, and with whom should the user 440 interact. Further, the preference can be inputted through an Adoc user interface (UI), and can be changed quite easily For example, as shown in FIG. 5, in an exemplary aspect of the present invention, the artifacts 510 may be included within a ubiquitous communication soup 550 including a plurality of available rich choices. Further, interactions between the artifacts 510 may be on demand, and adapt to environmental changes. Further, frustration energy may be usable for guiding a channel selection.

Smart Distance Realization

Example Scenario

The following example may be used to explain how smart distances among different enterprise users can be implemented with Adaptive Document (Adoc). An Adoc is a business object that is implemented using Enterprise Java® Bean. It has state machines inside the bean to specify its states under various contextual situations. It also provides a convenient Graphical User Interface (GUI) for user interaction.

Figure 6:
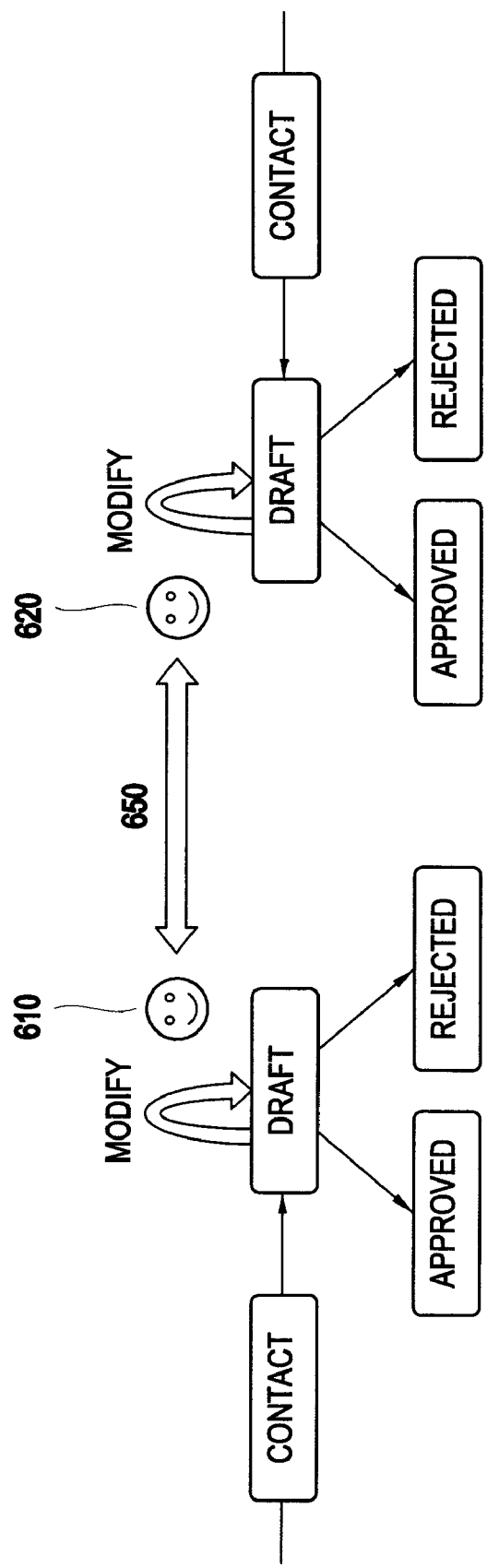
FIG. 6 illustrates a smart distance 650 between contract managers 610, 620, according to the exemplary aspects of the present invention.

For example, FIG. 6 illustrates a smart distance 650 between contract managers 610, 620. The state machines may represent the business flows for contracting process.

For each user in an enterprise system, there is a user agent associated with it. As shown in FIG. 6, within the user agent, there is a business process template pool that specifies all the different business processes with which this user is associated. For example, the left side of FIG. 6 shows a simple business process with which a sales contractor manager might be involved.

In this example, a customer may first contact the manager requesting to sign a contract before buying a microelectronic product. Then, the manager and the customer will discuss about the contract and make a series of modifications. When the draft is finalized, it will be sent to the upper management chain. The results will be that either the draft is approved or rejected.

Awareness among contract managers is needed during the "Draft" stage. Because it is possible that the two contracts in progress might be related to the same product. Thus, from the enterprise point of view, the two managers should be aware of each other's activities and interact with each other so as to get the "best deal" in the contracts (e.g., see FIG. 6). This functionality is realized by extended Adoc and by the "Smart Distance" directory of the enterprise server.

Local Registry

Whenever a user is logged onto the system, an agent is generated to represent the user. This agent will track the user's activities and provide the "smart distance" functionality based on the user's registration. The local awareness registry will contain a Hash table.

Figure 7:
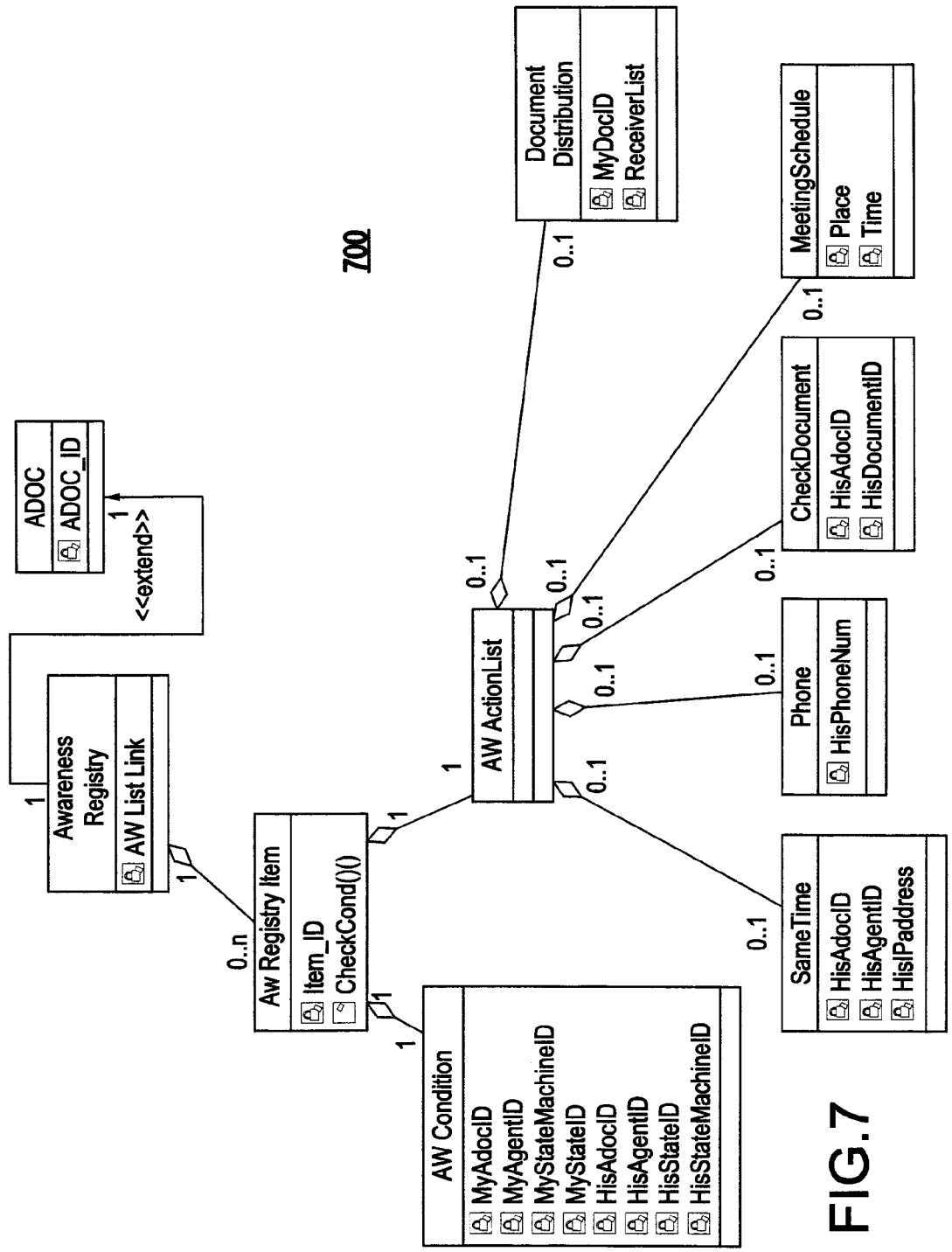
FIG. 7 illustrates a specific example UML representation of a local registry for smart distance according to an exemplary aspect of the present invention.

Each item of the table gives one awareness requirement and contains the following listed information. FIG. 7 shows a specific example UML representation of the local registry 700 for smart distance according to an exemplary aspect of the present invention. The local registry 700 is an extension of Adoc. The distance values in this example of the local registry 700 include no awareness, SameTime interaction, Phone interaction, Check document, and meeting schedule.

It should be noted that the model for local registry can be quite different under different environments The following example explains some exemplary, non-limiting items that might be contained in a local registry.

1) Awareness Condition for the current agent. This entry gives the condition to start the Smart Distance process, or in other words, the condition to start choosing distance values.
   a) BPT_ID: Business Process Template ID. For example, the Template ID for Contract business process as illustrated in FIG. 2.
   b) State_ID: the state for the BPT_ID. For example, the "DRAFT" state in the above example.
2) Condition of the other agent to interact with
   a) AE_Category: the category of the other agent to look for. In the above example, the category of the agent to look for is also a contract agent.
   b) BPT_ID: the business process that the other agent is currently in.
   c) State_ID: the state of the BPT_ID the other agent is at.
3) Actions: this gives the awareness actions list to be taken. These actions are distance values. For each action, the following information needs to be registered. There might be more than one action to be taken.
   a) Awareness_ID. This gives the category of awareness to be requested. The list of awareness categories is listed in the global server. One example of the awareness is to provide a communication channel such as open a SameTime window for interaction. Some awareness categories might be quite complex and may even contain the interaction choreography or conversational policies and protocols that specify a structured interaction.

To implement the extension of Adoc to handle smart distance, the code can either be directly modified, or an Adoc builder may be used.

Figure 8A:
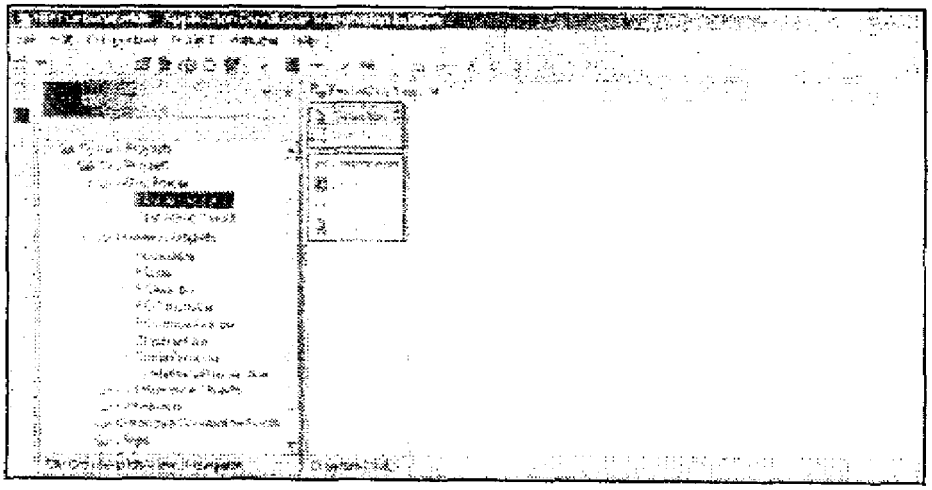
FIGS. 8A and 8B illustrate the "state machine editor" and the customization Wizard of the Adoc builder.
Figure 8B:
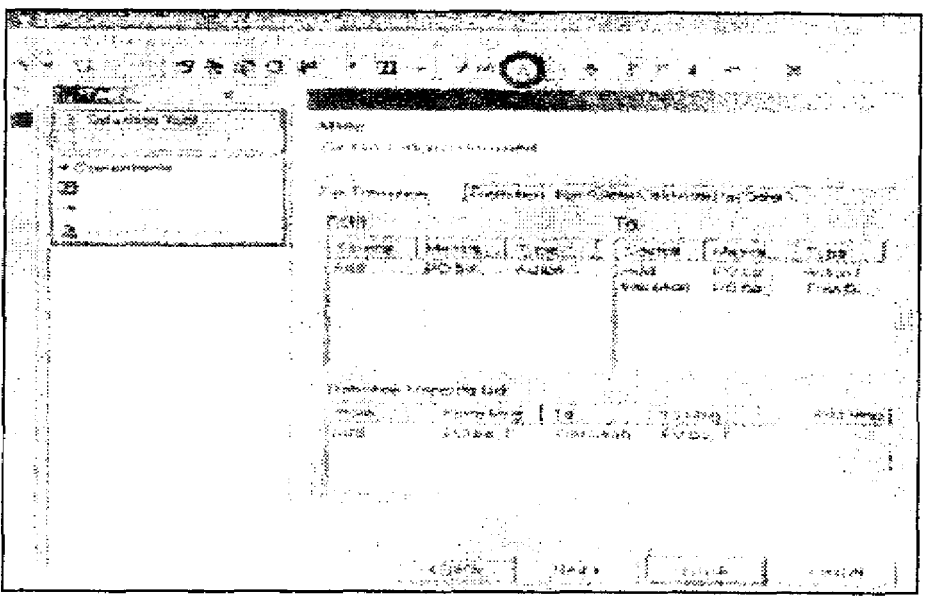

For example, FIGS. 8A and 8B illustrate the "state machine editor" and the customization Wizard of the Adoc builder. Specifically, FIG. 8A illustrates a display screen 810 for an Adoc state machine editor, and FIG. 8B illustrates a display screen 820 for an Adoc customization Wizard.

Global Awareness Server

Figure 9:
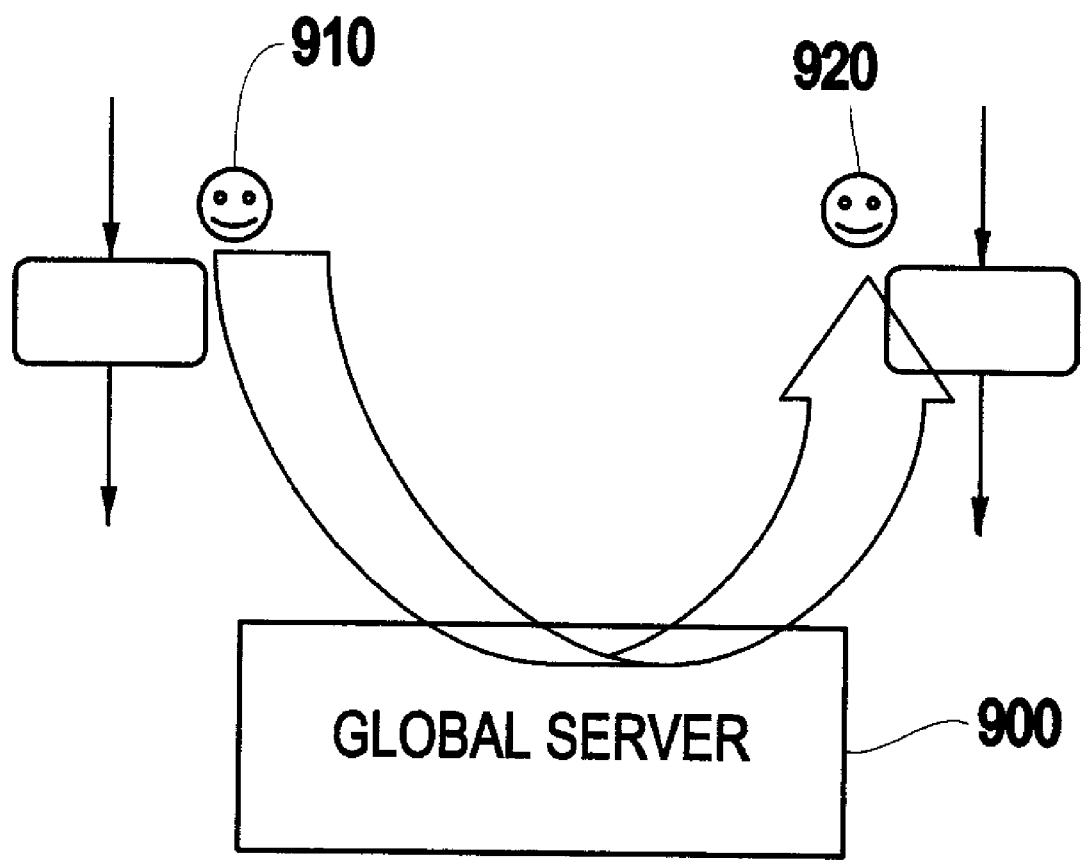
FIG. 9 illustrates a global awareness server which may be used control the degree on the channel from a first artifact to second artifact, according to an exemplary aspect of the present invention.

The awareness functionality during the runtime is realized by a Global "Smart Distance" Awareness Server. FIG. 9 illustrates a global awareness server 900 which may be used to control the degree on the channel from first artifact 910 to second artifact 920.

The local registration of an agent gives its user's preference for distances. However, sometimes the enterprise might want to control the awareness level among various agents from a global point of view. For example, one user might want to interact with his director at a certain state. However, the enterprise might not allow this interaction because the user should interact with his/her first line manager for the corresponding issue (e.g., use the "chain of command"). Thus, based on the contextual condition, the global smart distance awareness server 900 can track all of the artifacts and enable negotiations and interactions. Specifically, the server 900 may enable individual awareness requests and also disable individual awareness requests.

The present invention realizes smart distance as an underlying principal for an on-demand enterprise. Specifically, in the present invention, a smart distance may be used in an on-demand system to interweave dynamic and heterogeneous business objects, intelligent agents and users. With a smart distance infrastructure operating therein, an enterprise can eliminate inefficiencies, such as those due to lags and latencies, and can respond to market conditions quickly.

Figure 10A:
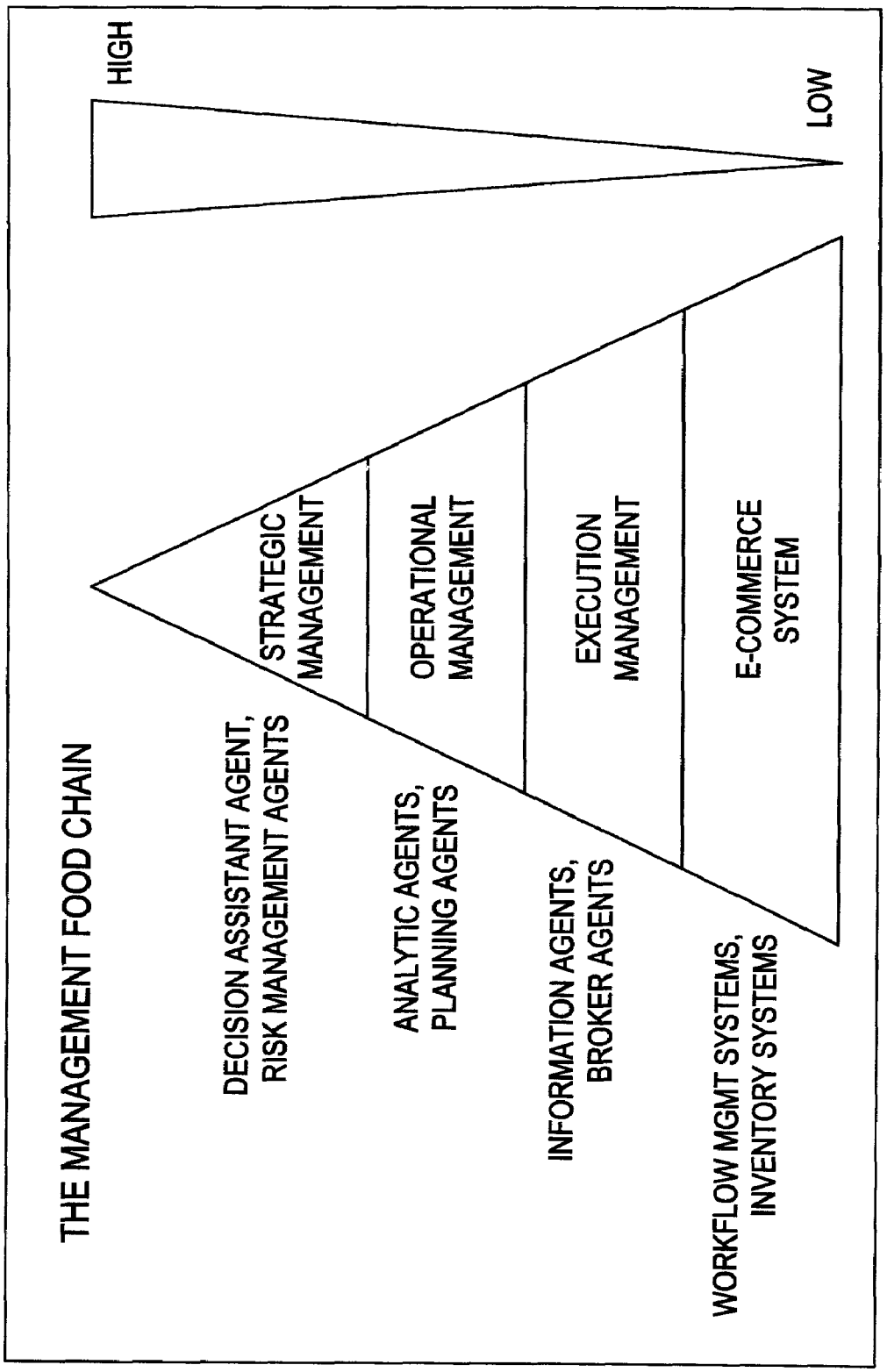
FIGS. 10A-10C illustrate a management food chain in a traditional enterprise, a mechanism for maximizing a performance of an enterprise, including a smart distance and an artifact, and a smart-distance enabled system and the interaction between strategy, operation, execution, information, and a user, respectively.

For example, FIG. 10A illustrates a management food chain in a traditional enterprise. In such a traditional enterprise, interactions are pre-coded, there is no flexibility on outside conditions, and the interactions cannot change even if the situation (e.g., context) changes. Further, awareness and interaction are limited, and there is no emphasis on different choices of interactions.

Figure 10C:
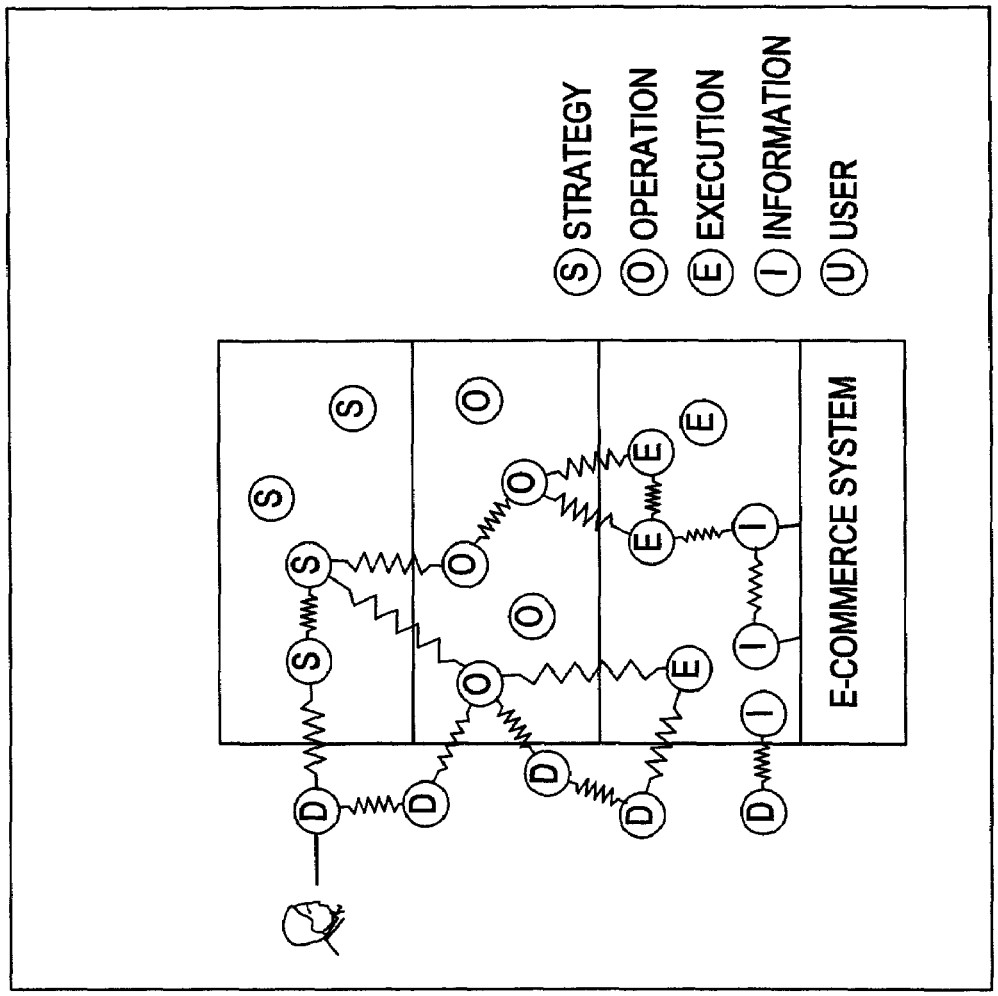
Figure 10B:
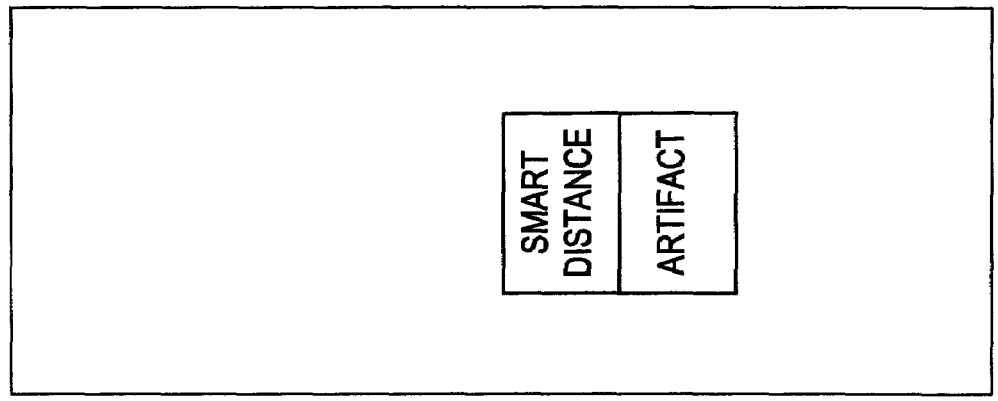

FIG. 10B illustrates a mechanism for maximizing a performance of an enterprise, including a smart distance and an artifact, and FIG. 10C illustrates a smart-distance enabled system and the interaction between strategy, operation, execution, information, and a user.

Generally, the inventive system may include a smart distance and an adaptive document (Adoc). Thus, the inventive system may include an awareness Adoc-enabled adaptive enterprise.

More specifically, the present invention may include a smart distance for an Adoc community. For instance, the present invention may be applied to the situation when a group of instances of Adoc are generated during a run time. The present invention enables the control of the awareness among such Adocs.

Further, a smart distance is defined above the Finite State Machine (FSM) and the agents of the Adoc. In addition, the present invention enables a smart distance among agents who operate on these Adocs (e.g., human agents and software agents).

In a conventional system, interactions between Adocs or their agents are specified by choregraphy only. Thus, an Adoc is not influenced by the activities of other Adocs if the choregraphy does not connect them. However, in many e-commerce situations, awareness should be provided among Adocs so as to best perform the task.

Figure 11:
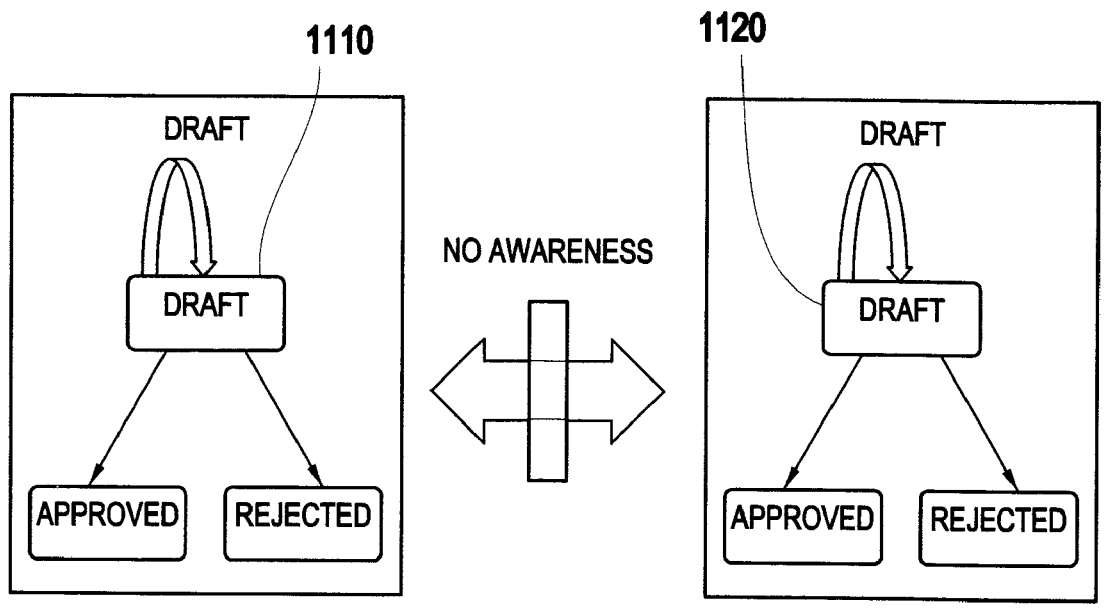
FIG. 11 illustrates a conventional system including two instances of contract Adocs.

For example, FIG. 11 illustrates a conventional system including two instances of contract Adoc 1110, 1120. In this example, there is no awareness between the Adocs.

Awareness between Adocs is beneficial for several reasons. For example, a retailer may have many suppliers. Assume that each contract Adoc binds the retailer with one supplier. Further, the agents for the retailer are different, but they all represent the retailer. In addition, several contract Adocs are running within the system.

In that case, agents (e.g., representatives) of the retailer need interactions. For instance, if the retailer has two contracts regarding the same product, only the lower price contract should be signed. Similarly, agents (e.g., human representatives) of the retailer need interactions during the modify phase so as to get the best deal.

Figure 12:
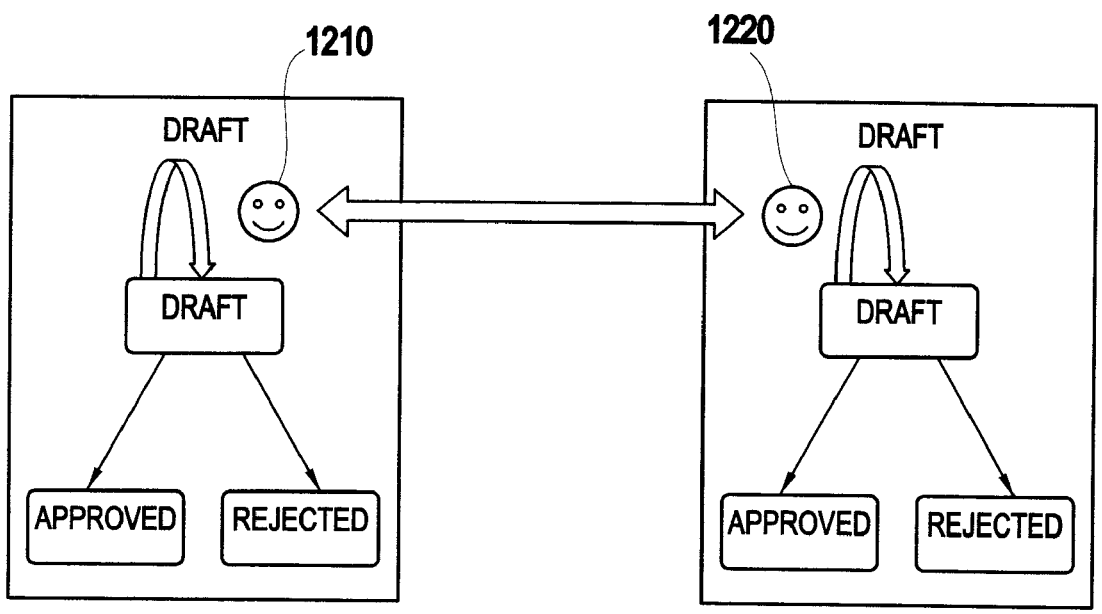
FIG. 12 illustrates a system in which the first agent may interact with (e.g., is aware of the actions of) a second agent, according to an exemplary aspect of the present invention.

For example, FIG. 12 illustrates a system in which the first agent 1210 may interact with (e.g., is aware of the actions of) the second agent 1220, to ensure that the supply contracts are optimally modified.

Figure 13:
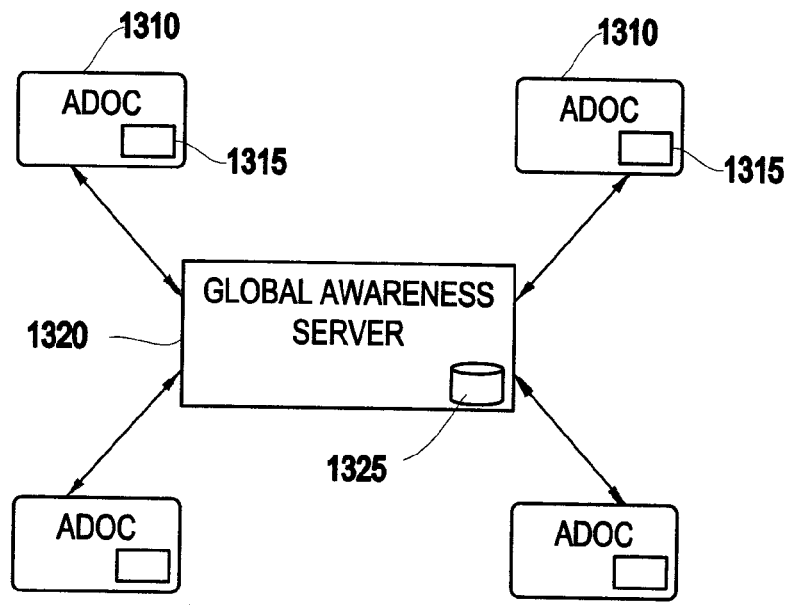
FIG. 13 illustrates a global architecture of an enterprise system according to an exemplary aspect of the present invention.

The present invention may further include a global architecture, as illustrated in FIG. 13. As shown in FIG. 13, the global architecture may include a plurality of Adocs 1310 which are connected to a global awareness server 1320. Further, the Adocs may include a local registry 1315, and the global awareness server 1320 may include a global registry 1325.

Thus, a client of the Adoc 1310 may input its requirements to a local ADOC awareness registry 1315. The Adoc may contact the global awareness server and register the local registry.

The various Adocs 1310 may then interact through the global awareness server 1320. For example, each Adoc instance logs on to the server when generated. Further, Adoc interaction may be through the global awareness server 1320.

For example, as illustrated in FIG. 9 (discussed above) the global awareness server may control how much the first agent 910 can know about second agent 920. Specifically, such control may be based on the local awareness registry of first agent 910 of its parent Adoc, and the awareness blocking of the second agent 920 in its local registry of its parent Adoc.

For example, the local awareness registry 715 may include information such as when awareness is needed, such as a client identification (ID) (e.g., a retailer), collaborative action (e.g. C: modify), and a state (e.g., draft). The registry may also store what awareness is wanted, such as an Adoc name, or a specification in the form of a rule or other representation (e.g., whether there is another retailer agent also in the state of draft regarding the same draft). The registry may also store what communication channel is wanted (e.g., an awareness controller). For example, the registry may automatically pop-up sametime or other communication channels.

Further, awareness channels or actions may be automatically adjusted based on the local registry. In addition, the local registry may include awareness blocking which may be used, for example, to block awareness requests from roles (e.g., agents) of other Adocs.

Figure 14:
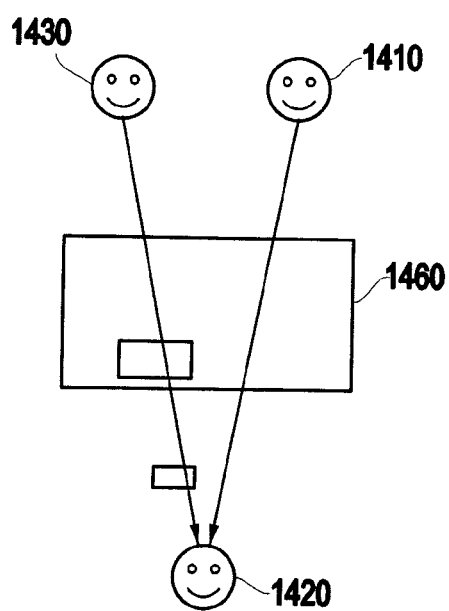
FIG. 14 illustrates a global awareness server for use in an enterprise system according to an exemplary aspect of the present invention.

Further, FIG. 14 illustrates a global awareness server 1460 which may be included in the present invention. As shown in FIG. 14, in the global awareness server 1460, more constraints can be incorporated with local registries so as to guide the business to the favorite directions. For example, a retailer (e.g., having agent 1410) can be aware of the activity of a first supplier (e.g., having agent 1420), but the present invention blocks a second supplier (e.g., having agent 1430) from knowing the activity of the first supplier.

Figure 15A:
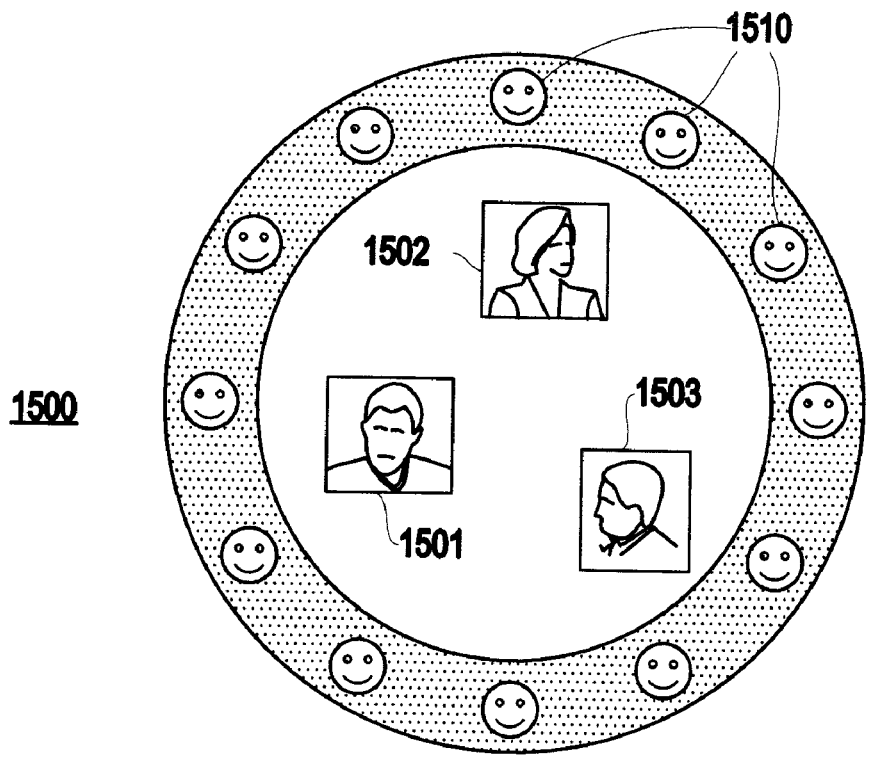
FIGS. 15A-15D illustrate an exemplary Adoc smart distance system 1500 (e.g., a smart distance system which uses contract Adocs) in accordance with an exemplary aspect of the present invention.

FIGS. 15A-15D illustrate an exemplary Adoc smart distance system 1500 (e.g., a smart distance system which uses contract Adocs) in accordance with an exemplary aspect of the present invention. As illustrated in FIG. 15A, the system 1500 may include a retailer (e.g., a furniture store) having many agents (e.g., first agent 1501, second agent 1502, and third agent 1503, etc.) which may be distributed (e.g., physically separated, such as in different offices of the same building, or in a different city or state). The exemplary system 1500 may further include many suppliers 1510 which may be distributed all over the world.

Figure 15B:
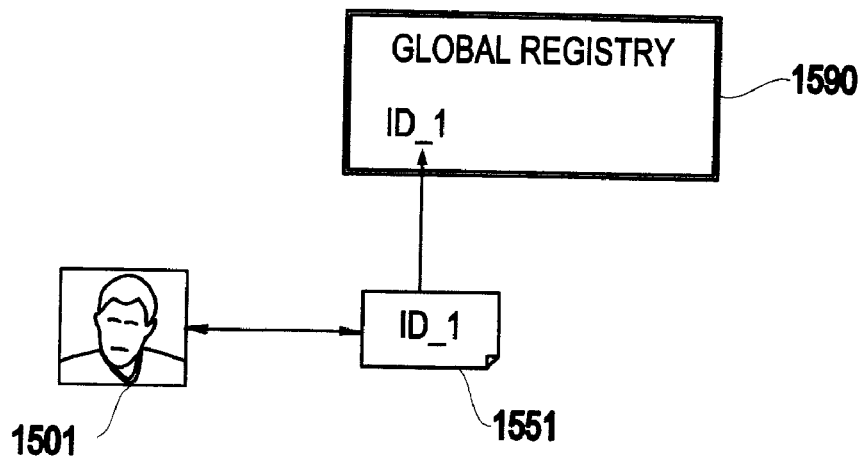

For example, in this exemplary system 1500, assume that there is a supplier 1510 logged into the enterprise, and wanting to sell/supply tables to a furniture retailer. As shown in FIG. 15B, first agent 1510 took the job and signed in. A contract ADOC 1551 is generated with ID_1 which will be used by the supplier 1510 and first agent 1501. In this case ADOC ID=1 and first agent 1501 will get an agent ID=A1.

Figure 15C:
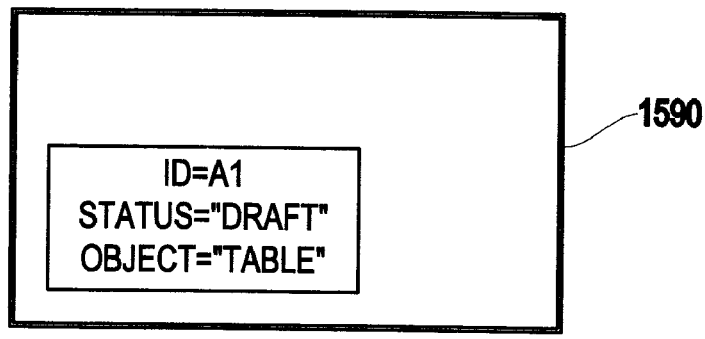

Thus, first agent 1501 registers the following Awareness Request:
1) Condition
   a) First agent's Info:
      i) ID=A1
      ii) State="Draft"
      iii) Object="table"
   b) Other Agent's info:
      i) ADOC ID=x (any)
      ii) Agent ID=x (any from retailer)
      iii) State="Draft"
      iv) Object="table"
2) Action
   a) Open Sametime chat room for both if not in the same building
   b) A phone call to scheduling a meeting if in the same building Further, as illustrated in FIG. 15B, first agent's registration is propagated to the global registry server 1590. The information is stored therein as shown in FIG. 15C. The global registry server 1590 will track first agent's status and will check the condition information whenever the first agent's status is updated. For example, the global registry server 1590 may notice that condition on first agent's information is satisfied.

Figure 15D:
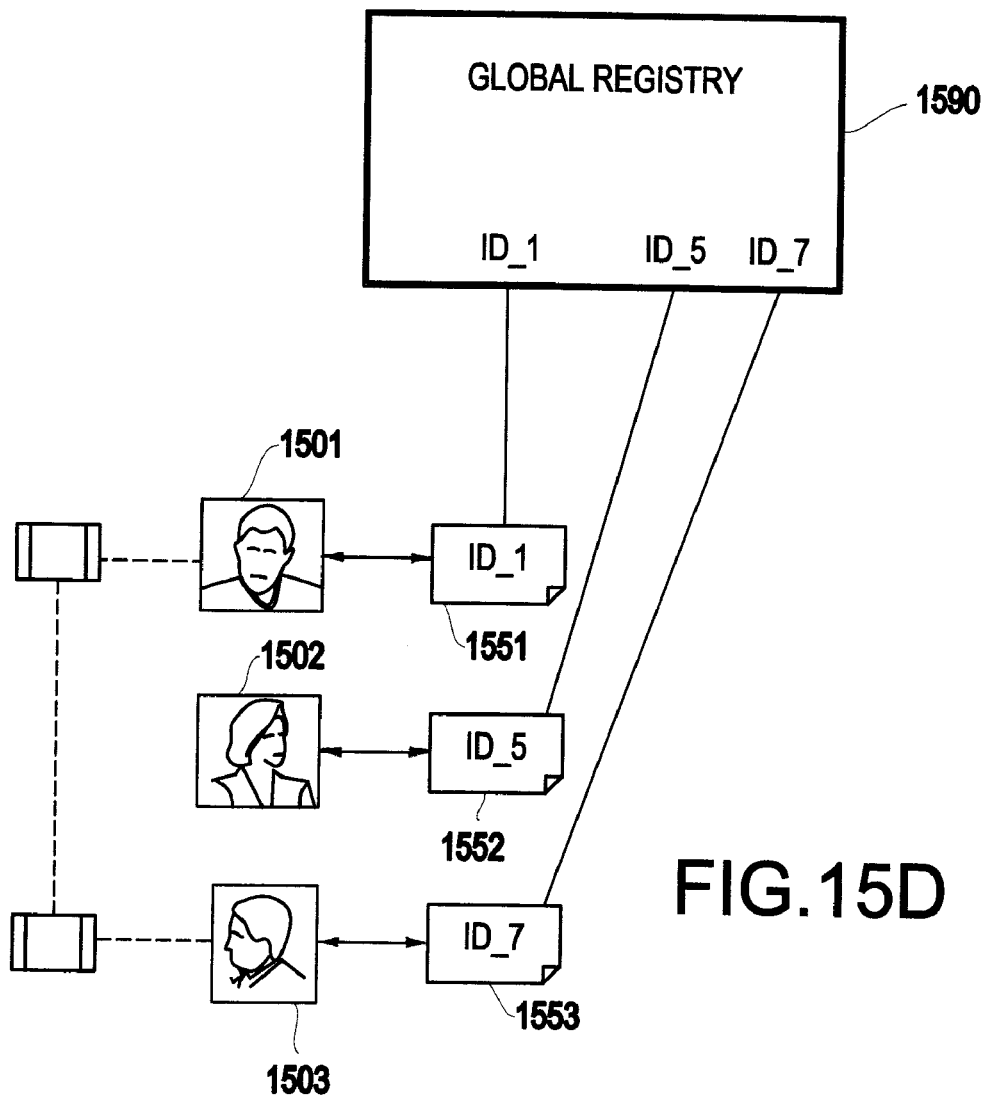

In addition, in the exemplary system 1500, assume that a supplier 1510 for a "chair" logged into the system, and second agent 1502 took the job for a contract. As shown in FIG. 15D, in such case, an Adoc document ID_5 1552 is generated. Further, second agent 1502 registered with the local registry. It should be noted that the awareness requirement has nothing to do with first agent 1501. The global registry server 1590 checked both Adocs and found that no awareness should be constructed Further assume that a supplier 1510 for "table" logged into the system 1500, and that the third agent 1503 took the job. In such case, an Adoc is generated with ID_7 1553 for third agent 1503 and the supplier 1510. The third agent 1503 registered the exact same awareness condition as the first agent 1501.

Further, assume, for example, that the retailer also registered quite similar conditions as first agent 1501, with the agent to be contacted being replaced by the supplier. Thus, for first agent 1501 and his supplier 1510, and third agent 1503 and his supplier 1510, all their conditions are satisfied.

Figure 16:
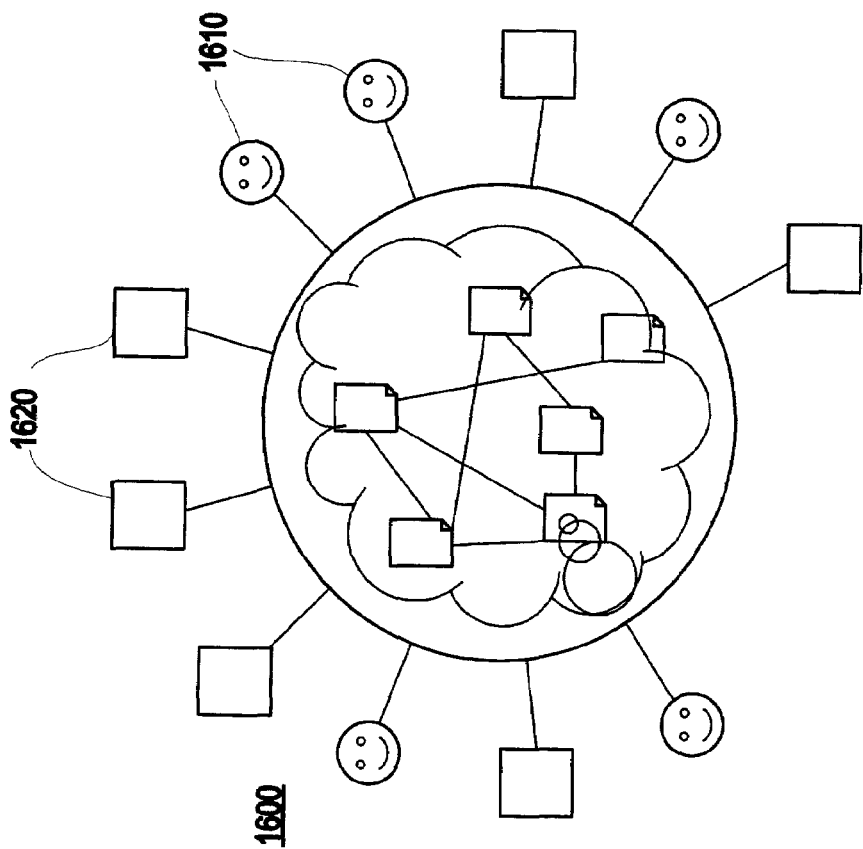
FIG. 16 illustrates an adaptive virtual enterprise 1600 in accordance with an exemplary aspect of the present invention.

In this case, for example, the global server 1590 responds to requests of first and third agents 1501, 1503, and opens the sametime window for their communication. The sametime window will be closed whenever one of the first or third agents moves to the next state (e.g., approval or reject). In addition, the global server 1590 may block the retailer's requests for business reasons FIG. 16 illustrates an adaptive virtual enterprise 1600 in accordance with an exemplary aspect of the present invention. As illustrated in FIG. 16, a smart distance enabled Adocs community may provide adaptive awareness among 1) persons using the enterprise (e.g., retailer agent 1610, supplier agent 1620, enterprise management team members), 2) software agents with various functionality, and Adocs.

For example, the enterprise 1600 may include person-ADOC awareness (e.g., retailer can request the status of an instance of an Adoc). The enterprise 1600 may also include agents-Adoc awareness (e.g., software agents can interact with Adocs to detect progress), and Adoc-Adoc awareness. The enterprise 1600 may also include person-Adoc-agents mixed interaction, and so forth.

Figure 17:
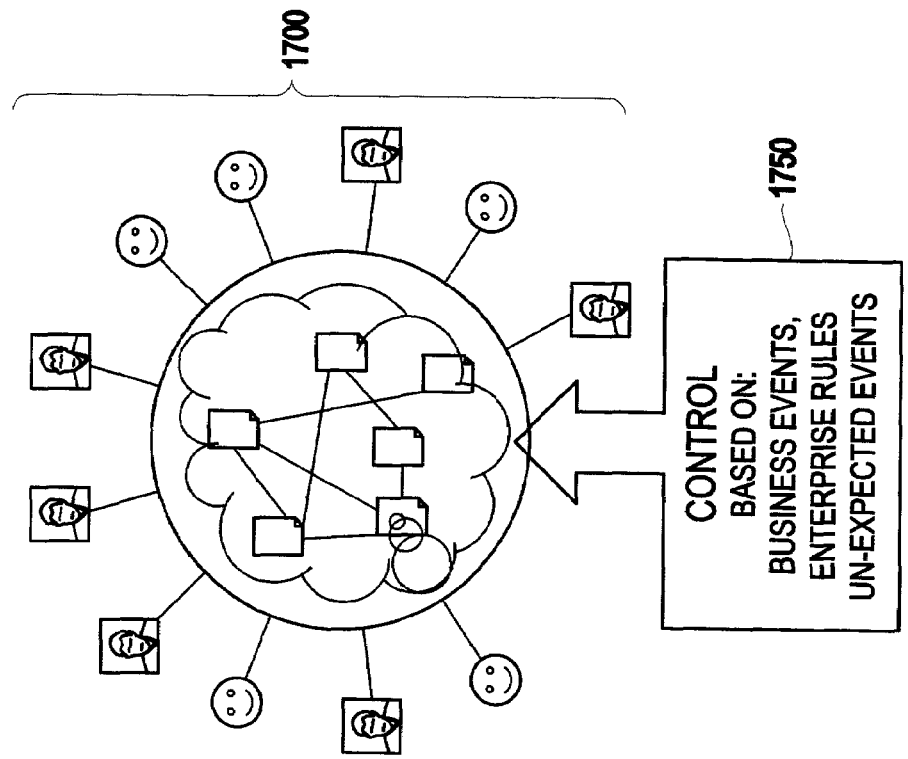
FIG. 17 illustrates an example of management and control of an adaptive virtual enterprise 1700, according to an exemplary aspect of the present invention.

FIG. 17 illustrates an example of management and control of an adaptive virtual enterprise 1700. Specifically, a controller 1750 may control the enterprise 1700 based, for example, on business events, enterprise rules, unexpected events, etc.

Further, the enterprise 1700 may include an enterprise management Adoc (e.g., a plurality of such Adocs). Such Adocs may encode the rules for enterprise management. Further, the inter-operation of the management Adoc can be used to influence/manage the operation of the enterprise. For example, the management Adoc may change/alert the operations of enterprise members (e.g., persons, agents, even ADOCs) etc.

Further, the enterprise 1700 may include a business operation event Adoc (e.g., a plurality of such Adocs). Such an Adoc may record business operation transactions/events in the enterprise 1700.

The enterprise 1700 may also include a business event prediction agent (e.g., a plurality of such agents). Such agents may analyze events and perform predictions. The results may be sent to the enterprise management Adoc.

The enterprise 1700 may also incorporate an adaptive enterprise control/response. For example, the enterprise 1700 may include smart distance control among various enterprise artifacts (e.g., persons, software agents, Adocs etc.). This allows the global behavior of the enterprise 1700 to be changed based on events/predictions, etc.

For example, the present invention may be applied to industry in the form of an adaptive enterprise system. Specifically, the concepts of the present invention may be applied to resource management for engineering and construction. This is a good application for the concepts of the present invention, specifically for a smart distance enabled Adoc and an adaptive enterprise. For example, this scenario may be used to study how to provide smart distance and adaptive awareness, how to adapt to changes in the construction process, and how to use Adocs to control the behaviors of the distributed construction processes.

Such a configuration may provide excellent results for the adaptive enterprise system. For example, it may enhance organizational intelligence and adaptability, streamline engineering and construction and business processes, help to develop stronger relationships with key stakeholders (e.g., employees, vendors, etc.), deliver resources/storage more cost effectively, and facilitate smart resource sharing and developing, and so forth.

Figure 18:
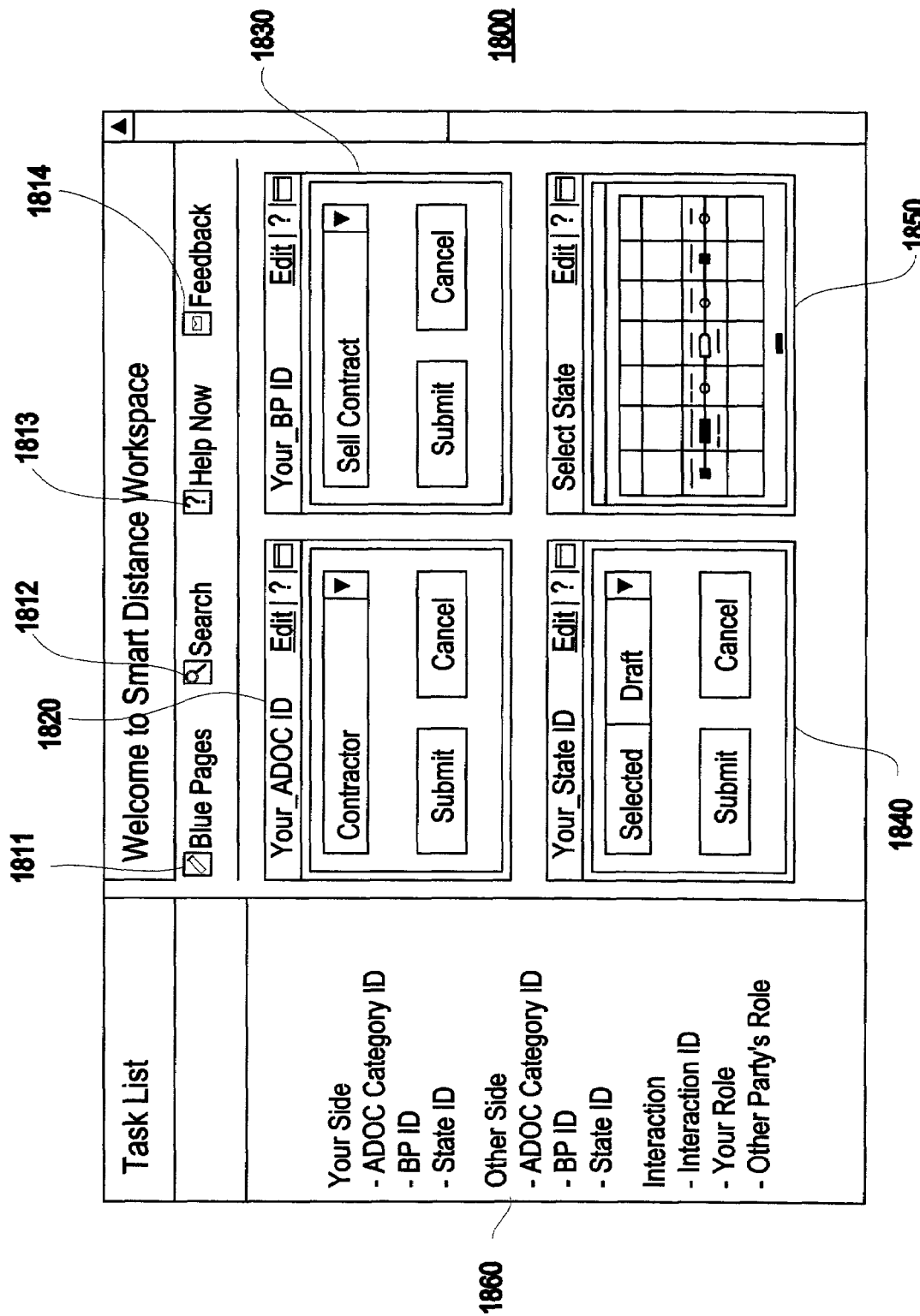
FIG. 18 illustrates a display screen 1800 which may be used as a user interface in an enterprise system, according to an exemplary aspect of the present invention.

Further, the inventive enterprise system may include a virtual enterprise system which is implemented using a plurality of computers connected together on a network (e.g., LAN, WAN, Internet). FIG. 18 illustrates a display screen 1800 which may be used as a user interface in such an enterprise system.

As shown in FIG. 18, the display screen 18 may include toolbar 1810 which exemplarily includes icons for BluePages 1811, Search 1812, Help Now 1813, and Feedback 1814. For instance, a user may position a cursor over the icon and click on the icon using a mouse to select the respective action corresponding to the icon.

The display screen 1800 may also include an area 1820 (e.g., Your_ADOC ID) for editing an Adoc identification, an area 1830 (e.g., Your BP ID) for editing a business process (BP) identification, an area 1840 (e.g., Your_State ID) for editing a state, and an area 1850 (e.g., Select State) for selecting a state.

The display screen 1800 may also include a task list 1860 which displays tasks in several (e.g., three) categories. For example, the tasks may be divided into a "Your Side" category, "Other Side" category and "Interaction" category. For example, under "Your Side" and "Other Side" categories, the user may select an ADOC Category ID, BP ID or State ID. Under "Interaction", the user may select an Interaction ID, "Your Role" or "Other Party's Role".

A "Sense and Respond" Enterprise System

The present invention utilizes the concept of a "smart distance" for an enterprise system (e.g., a complex enterprise system). In particular, the invention illustrates how to use it to interweave dynamic and heterogeneous business objects, intelligent agents, and most importantly, human beings within enterprises.

Further, the present invention may include an "artifact" which may use a state machine. This is completely different from the underlying requirements of a person-to-person system. In addition, the present invention may include a smart distance system involving an adaptive smart distance and/or an on-demand smart distance.

In one specific application, the present invention includes the design of a generic agent architecture. Specifically, the architecture includes a Business Entity enabled, Smart distance oriented Agent (BESA) architecture, which is applied to a "sense and respond" system.

With "smart distance" infrastructure operating within an enterprise system, the system can eliminate inefficiencies that are due to lags and latencies that exist in the traditional environment. With various entities at different layers, the enterprise system can sense and respond to market conditions quickly and effectively through a closed-loop hierarchical control.

A BESA agent is intended to be operated within complex "sense and respond" systems that include interwoven dynamic and heterogeneous business objects, intelligent agents, and, most importantly, human beings. BESA uses the smart distance principle to guarantee that the configurations and interactions of the elements of an enterprise system can be best placed, at any time and under any contextual environment.

The concept of a "smart distance" comes from the observation that people like to adjust the distances among them when there are choices. The present invention further extends this concept by including various elements in an enterprise system such as business objects, and intelligent agents, in addition to human beings.

Specifically, a "smart distance" in an organization is defined as a distance that is autonomously and adaptively adjusted based on contextual information with the goal that tasks can be best performed. The design principal of BESA is to guarantee that the "distances" of its elements are adaptively placed to favor the task, at any time and under any contextual environment.

For example, BESA may be applied to the design of a Supply Chain Management System for Microelectronic Manufacturing. The system is ecosystem-inspired in the sense that it can be viewed as an environment composed of various elements that may be generated dynamically. These elements conduct frequent, flexible local interactions with each other and with the dynamic environment that they inhabit.

The interaction behaviors can be specified during the run time to guarantee the best awareness needed. At the high end of the system are the people within the enterprise, who receive critical information just in time and who interact among themselves and with other artifacts just in time, thanks to the smart distance awareness mechanism. It is the people who, based on their experiences, make important decisions to guide the enterprise.

These decisions are usually difficult, and in many cases impossible, for artificial agents to make. The collective behaviors of the humans and various other artifacts of the enterprise guarantee that the best thoughts are executed, and thus make the enterprise better adapt to the dynamic and ever changing environment.

Smart Distance for Business Entity Agents

The concept of a "smart distance" and an enterprise system may be extended to agent supported collaborative work where intelligent agents are used to adjust the communication channels among people based on contextual information. The concept may be further extended to an adaptive enterprise system to refer to the situation that different artifacts dynamically adjust their "distance" configurations such that the performance of the enterprise can be maximized. These artifacts can be users of the enterprise, business entity agents, and business objects, etc. The "distance" refers to the various degrees of awareness, communications, and interactions among different artifacts.

The following is a formal definition for smart distance for an enterprise system:

E is an Enterprise system $A = \{a_1, \ldots, a_n\}$ is the set of all the artifacts of this enterprise system. An artifact can be an object, an autonomous element, an intelligent agent, a database system, an information system, or a human being etc.

For any two artifacts $a_i$ and $a_j$, suppose that there are $I_{ij}$ different kinds of interactions for $a_i$ to interact with $a_j$. We call each kind of interaction a "channel". For example, people to people interaction through web can have video channel, audio channel, text channel.

For a given channel c, there might be different degree of interactions, we used $|c| \in [0,1]$ to represent the degree of interaction. The bigger the value of $|c|$, the more intense the interaction for this channel. With $|c|=1$ to represent the strongest interaction for this channel, and $|c|=0$ to represent the weakest interaction through this channel. In most case, $|c|=0$ means that this channel is closed. For example, the degree of interaction for a video channel from one person to another can be defined as the resolution and the update rates of the video transmission. The degree of interaction from a monitoring agent to a user can be defined as the frequency that the monitored data is sent to the user.

The distance from $a_i$ to $a_j$ can thus be represented as a vector: $d_{ij} = \langle |c_1|, \ldots, |c_{I_{ij}}| \rangle$.

The distance configurations (at time τ) for a given enterprise can thus be represented by a matrix:

$$D(\tau) = \begin{pmatrix} d_{11}(\tau), \ldots, d_{1n}(\tau) \\ \cdots \\ d_{n1}(\tau), \ldots, d_{nn}(\tau) \end{pmatrix}$$

Under a given contextual/environmental condition at time τ, $\Omega(\tau)$ (it might contain many parameters), there exists a natural distance configuration (or called best placed distance configuration) $D_{natural}(\Omega(\tau))$. If the distance configurations of all the artifacts in the enterprise E is equal to this natural distance, that is, if $D(\tau)=D_{natural}(\Omega(\tau))$, then the performance is maximized.

In most situations, $D(\tau) \neq D_{natural}(\Omega(\tau))$

Smart distance for an enterprise system means that the artifacts in an enterprise act autonomously such that $\|D(\tau)-D_{natural}(\Omega(\tau))\|$ is minimized.

A goal of the present invention is to construct the enterprise system such that all the artifacts will be woven by "smart distance". Since usually best distance configurations are very difficult to pre-determine/pre-code because of the complexity of the environment, a way of adjusting these natural distances easily needs to be provided.

An Enterprise Scenario from Supply Chain

A problem domain which has been addressed by the inventors is a Supply Chain Management System for Microelectronic Manufacturing. The core flow for microelectronic manufacturing contains the sub-flows such as:

1. From wafers to devices: The wafer is a round thin piece of silicon that looks similar to a CD. Typically cycle times range from a few days to 2 weeks.
2. From devices to modules: The devices are then placed on a substrate and packaged to create a module that takes between a few days to 2 weeks.
3. From modules to cards: Modules are then combined together on a card that is the topmost-level component.

Depending on the customer, a microelectronic manufacturer may dispatch wafers, devices, modules, or cards. Within each major manufacturing activity there is series of operations and extensive testing. The key decision points and corresponding decision support systems in the supply chain management (SCM) process can be categorized by the supply chain component supported and its time frame or decision tier.

An SCM process manages the flow of activities from order creation, order processing, order completion to product delivery consists of business processes, control and data flows, and decision structures. An SCM process consists of four steps: demand creation/forecasting, production planning, manufacturing execution, and available to promise.

SCM Decisions in the semiconductor industry typically fall into one of four decision tiers: strategic, tactical, operational, and response (dispatch). The categories are based on the planning horizon, the apparent width of the opportunity window, and the level of precision required in the supporting information.

1. The first decision tier, strategic scheduling, is driven by the time frame or lead time required for business plan, resource acquisition, and new product introduction. Here decision makers are concerned with a set of problems that are three months to seven years into the future.
2. The second tier, tactical scheduling, deals with problems the enterprise encounters in the next week to six months.

Issues considered are made of yields, cycle times, and binning percentages, delivery dates estimated for firm orders, available "outs" by time buckets estimated for bulk products, and daily going rates for schedule driven product are set.

3. The third tier, operational scheduling, deals with the execution and achievement of a weekly plan such as the shipments are made, serviceability levels to be measured, recovery actions to be taken. Tools typically use in support of daily activities are material resource planning, decision support, recovery models, prioritization techniques and deterministic forward schedulers 4. The fourth tier, real-time response system, addresses the problems of the next hour to a few weeks by responding to conditions as they emerge in real time and accommodate variances from availability assumed by systems in the plan creation and commitment phases. Usually, analytics agents are used to render response based upon commitments, business policies, and business rules.

A "sense and respond" system can be built to satisfy the issues addressed in the above tiers by providing awareness among various elements such as humans and business artifacts, etc. The system can dispatch scheduling decisions that are concerned with monitoring and controlling of the actual manufacturing flow or logistics; and instruct the operator of the next steps to achieve current manufacturing commitments.

The system can also make decisions concerning trade-offs between running test lots for a change in an existing product or a new product and running regular manufacturing lots, lot expiration, prioritizing late lots, positioning preventive maintenance downtime, production of similar product to reduce setup time, down stream needs, simultaneous requests on the same piece of equipment, preferred machines for yield considerations, assigning personnel to machines, covering for absences, and reestablishing steady production flow after a machine has been down.

An enterprise system built in this way can be viewed as an ecosystem that is composed of various artifacts such as business entity agents, business objects, and people, with smart distance connecting them to provide just in time information and decision making. For example, FIG. 10A (discussed above) depicts a management pyramid for BESA agents that add value to the traditional SCM system for Microelectronic Manufacturing.

As shown in FIG. 10A, at the lowest layer of the pyramid are the raw E-Commerce systems most of which are legacy systems such as workflow management systems, inventory control systems, scheduling systems, and databases. The next level up is the execution agents that interact directly with the E-Commerce systems and information sources. The execution agents consume the information generated by the lowest level E-Commerce systems, and render control on those systems on behalf the agents at the higher level of the pyramid.

The examples of execution agents include information agents and broker agents. The operational agents sense the situations produced by the execution agents, conduct the analytics activities, and respond to the situations back to the execution management layer. The examples of such agents include analytics and planning agents.

The highest level of the management pyramid is the layer of strategic management agents that sense the situations from operational management agents, conduct strategic analysis (automatically or cooperatively with decision makers), and respond to the situations based on existing enterprise goals or policies. The examples of such agents include decision assistant agents, risk analysis agents etc A Typical Scenario An example of typical use case for continuous demand-driven Build Plan and inventory optimization in the domain of microelectronic manufacturing can be described as follows. End-of-quarter revenue targets (per module family) are released/updated after the meetings among business line managers and executives.

A business line manager (BLM) has a pre-determined set of module families for which he has financial responsibility and, therefore, whose actual revenue (accumulated so far) and revenue outlook (for remaining weeks in the current quarter) he is interested in tracking against the revenue target of the current quarter. Whether the progression of the accrued revenue is normal or below target is determined by the system using a wineglass model. Please note that BESA_R is used herein to refer to the "sense and respond" system that BESA agents inhabit.

Main Course of the Scenario

1 On the ith day of the current week, a BLM selects a set of saleable part numbers to view the future weekly actual sales and planned demand quantities through BESA monitoring portal.

2 Detection of Situation and Alert:

2.1 BESA_R issues an alert showing the current sales quantities of some selected saleable part numbers in the nth week are out of their bands 2.2 BESA_R recommends adjusting the planned demand quantities and safety stock requirements for the nth week.

3 Recommendation:

3.1 BESA_R invokes demand planning module and inventory planning module to provide recommended demand quantities and safety stock requirements for the nth week.

3.2 BESA_R disaggregates the weekly demand quantities into daily demand quantities.

3.3 BESA_R recommends altering daily build plan in order to optimally match new daily demand statements, thus high serviceability, and minimize manufacturing and inventory costs.

3.4 BESA_R invokes Materials Requirements Planning (MRP) explosion and implosion module to generate optimal daily build plan, including common wafer start quantity and manufacturing release quantity in each part number level within the Bill of Material (BOM) chart associated with the selected saleable part numbers.

4 Prediction and Risk Assessment:

4.1 BESA_R predicts the to-be manufacturing cost, inventory cost, and service level associated with the selected saleable part numbers based on new demand statements and new build plan.

4.2 BESA_R predicts the as-is manufacturing cost, inventory cost, and service level associated with the selected saleable part numbers based on new demand statements and old build plan.

4.3 BESA_R concludes the financial and serviceability benefits of applying newly recommended demand statements, safe stock requirements, and build plan.

5 Decision Making by BLM:

5.1 The BLM summarizes the financial and service benefits and reports to the strategic management team (BLE's and GM's) for their approvals.

5.2 Upon the approval, the BLM releases the new build plan to sites for manufacturing execution. The BLM releases the new demand statements to procurement team to alter buy plan.

The manufacturing execution system is the e-Commerce system of the management pyramid depicted in FIG. 10A.

Execution agents are those interacting directly with the manufacturing systems, e.g., inventory agents or data agents. Operation agents include planning agents, MRP agents, alert and situation agents that generate business exceptions.

Strategy agents are those agents that make recommendation and provide risk assessment. If two agents are performing semantically related tasks, they need to be aware of each other. In other words, they have to be "closer" to each other cognitively. In the present invention, the cognitive closeness selection between two agents is modeled by smart distance.

Designing BESA

The scenario described above led to the following exemplary design for BESA architecture:

1. An agent should be adaptive to dynamic information requirements and resource limitations via adjusting its perceptual strategy. Smart distance allows an agent to obtain all the distance values and select the best configuration based upon pre-defined commitments. An example distance configuration might be to connect to all the Inventory Agents with inventory less than tolerant level, so as to establish a shared plan to increase the inventory.
2. An agent should adapt its choices among potential reasoning tasks to dynamic local and global objectives. For example, different manufacturing domains may require different algorithms for conducting customer demand forecasting. Hence, an agent should be able to understand the business context it is running within and select the best analysis engine.
3. An agent should adapt its control mode to dynamic goal-based constraints on its actions and uncertainty about its environments. The execution environment in an enterprise is usually diverse. Various kinds of devices, hardware, software, storages, and networks are likely to coexist in the same enterprise. When an agent is about to render control to its environment, (e.g. changing building plans for a certain manufacturing line), it should be able to detect the control mode based on the target objects to be updated or modified. Moreover, an agent should adapt its meta-control strategy to its dynamic configuration of demands, opportunities, and resources.

Figure 19:
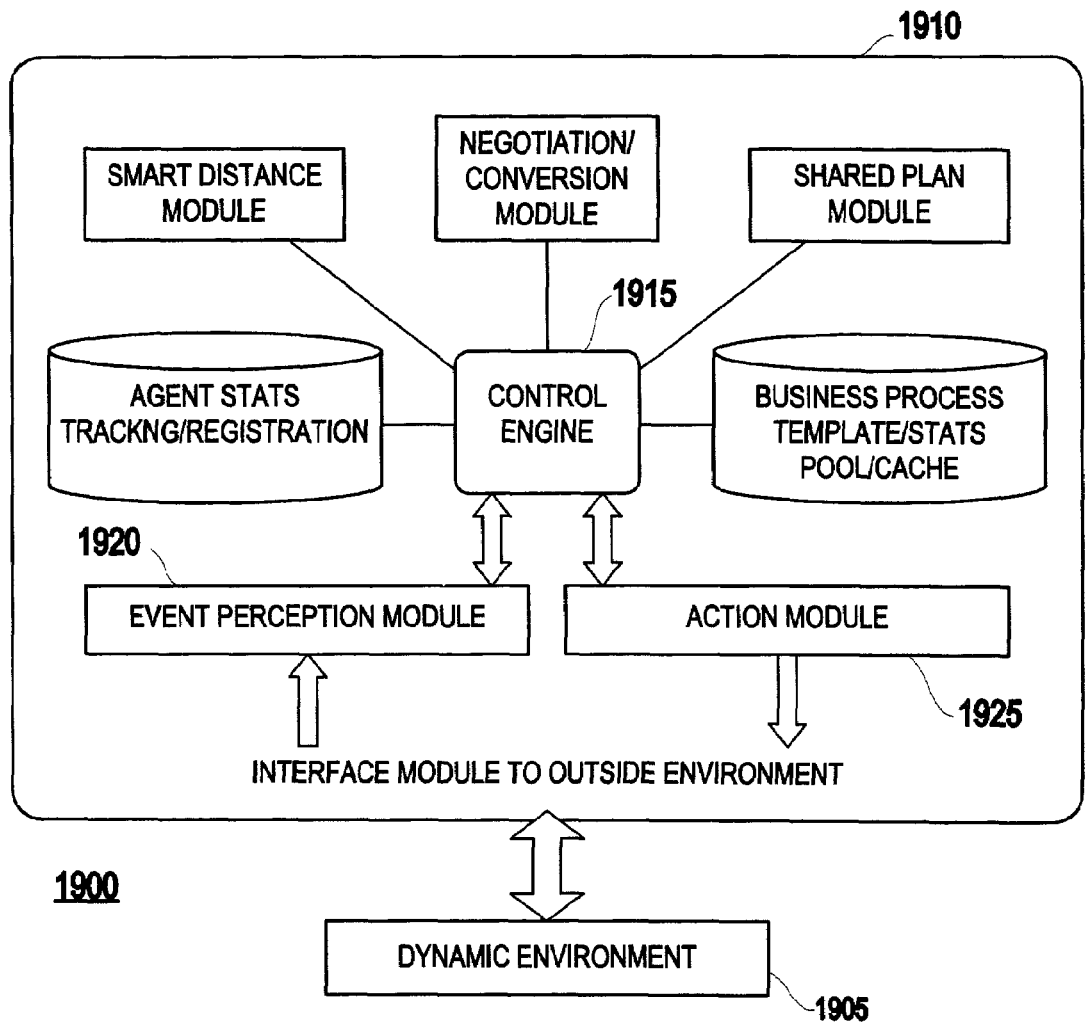
FIG. 19 illustrates a generic architecture of a business entity agent (e.g., BESA), according to an exemplary aspect of the present invention.

FIG. 19 illustrates a generic architecture of a business entity agent (e.g., BESA) 1900. The present invention allows BESA agents to function effectively and adaptively in the changing environment 1905.

The Interface module 1910 is the agent's communication channel to the outside world and can be used for interaction purposes between among artifacts. The Control Engine 1915 is the control center of the agent for various functionalities and behaviors. The Event Perception module 1920 analyzes the data coming from the Interface Module and detects possible events. The Action Module 1925 generates various actions and influences the outside environment through the Interface Module 1910.

The other modules (e.g., smart distance module 1930, Negotiation/Conversation module 1935, and Shared Plan Module 1940) are used by various agents across the three layers and perform various tasks. It should be noted that this is the generic architecture. In actual agent implementation, a module may be null if there is no corresponding functionality requirements for the agent. For example, an information agent at the third level (e.g., see FIG. 10A) may not be a Shared Plan Module 1940 if there is no collective task for the agent to be involved.

FIG. 10C (also discussed above) illustrates an agents' interactions in BESA. In FIG. 10C, springs are used to represent the situation when smart distance is used among agents. Further, an agent is represented by a circle, with a character to identify its type.

The "sense and response" enterprise where BESA inhibits is a complex system that includes interwoven dynamic and heterogeneous business objects, intelligent agents, and most importantly, human beings. With "smart distance" infrastructure operating within BESA_R, the enterprise can eliminate inefficiencies that are due to lags and latencies that exist in the traditional environment.

FIG. 10C shows various BESA agents that inhibit the management pyramid (e.g., FIG. 10A). The springs are used to represent smart distances between agents as adjusted by contextual information.

The behaviors of various artifacts of the system may be as follows:

1. Strategy Agents

Whenever there are needs to change the strategy, the user inputs the updated strategy into the corresponding strategy agent. The strategy agent analyzes the updated strategy and forms a set of commitments. These commitments will be sent to the related agents in the operation layer. When receiving a new commitment, an agent will adapt its behavior so as to meet the commitment requirements.

The commitment is sent to the agents through Business Process Commitment Language (BPCL). The commitment that is sent to a single agent can be theoretically represented as CR(M, C, T) where M is the set of messages the agent expects to receive, C is a set of constraints defining the scope and condition of applying this commitment, and T is a set of tasks that the associated agent may perform. A commitment that is sent to a group of agents can be theoretically represented as CR(G, P, M, C, T) where the terms M, C, and T hold the same meaning as the individual commitment.

The term G refers to the identity of the group of agents that should collaboratively perform designated tasks. It contains the correspondence list paired by each involved agent and its corresponding role. The term P gives the SharedPlan. It is a protocol in the form of a tree that divides the task and assigns roles for each involved agent in this SharedPlan tree.

2. Information Agents (the Third Layer).

An entity agent might contact information (situation) agents to perform some reasoning services. Information agents aggregate, filter, and reason on input data from various Data Agents, other Information Agents, or E-commerce systems at the lowest layer (FIG. 8) and infer business situations in corresponding domain. New business situations are returned to the calling agents. Situation agents come with many forms, e.g., rules engines, data mining modules, or forecast algorithms and can be implemented within the ABLE framework.

3. Data Agents

An Entity Agent may contact Data Agents that are embedded in the E-Commerce system to request certain data necessary for the sake of performing its own tasks. An Entity Agent might also contact Data Agents for its corresponding need to directly access the data. Data Agents will search appropriate data sources, browse target enterprise data storages, fetch interesting data, and return the data back to requesting Entity Agent. In doing so, the Entity agent may perform further analysis on fetched data or delegate the task to other Information Agents for further analysis.

4. Interaction Among Entity Agents (AE) of Various Types:

An Entity Agent might need to communicate/interact with other Entity Agents at various stages and at various levels (FIG. 3) so as to perform a joint task, for example, to realize the smart distance of various users of the adaptive enterprise or to fetch necessary information about the execution of shared plans.

5. Enterprise User

Whenever an Enterprise User logs on the system, an agent will be spawned for this enterprise user as his/her delegate. This agent will be responsible for the interaction of the enterprise user with other agents and other users. An enterprise user can provide input on any strategic changes into the system. This is done through specialized graphical user interface. The request will be propagated into the strategic management layer of the system. Moreover, an Entity Agent is responsible for sending the content of the request to the Enterprise Dashboard where the enterprise user and system administrators are able to monitor project status.

6. Interaction Between/Among Enterprise Users.

Entity Agents are responsible for providing smart distance enabled interaction among various enterprise users. The preferred distance configuration settings under different situation context may be inputted through a GUI.

Control Flow in BESA

Figure 20:
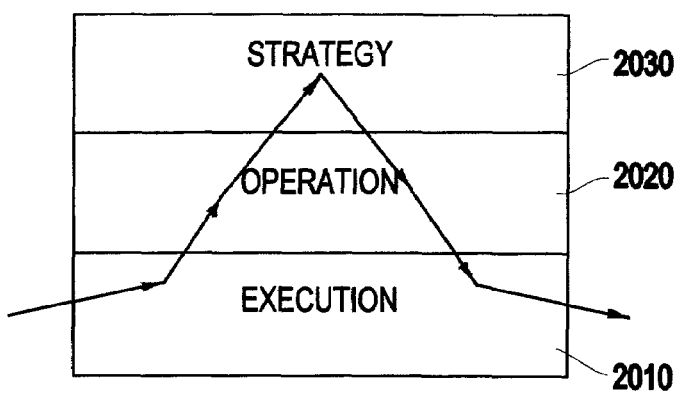
FIG. 20 illustrates the control flow among the execution layer, operation layer and execution layer in an enterprise system, according to an exemplary aspect of the present invention.

As discussed above, BESA agents can be grouped into three layers: Strategic Management, Operational Management and Execution Management. FIG. 20 illustrates the control flow among the execution layer 2010, operation layer 2020 and execution layer 2030. Specifically, the dash lines in FIG. 20 indicate the control flows among the layers.

Agents in the Execution management layer respond to the enterprise situations quickly and directly through scripted business process models. A notable example of the execution management is deterministic workflow management where workflow models are defined at the build time and executed at the run time.

Agents in the operational management layer perform management tasks that require more reasoning and more complicated computation. It is not uncommon that BESA system needs to provide decision support capability so more intelligent management actions can be derived towards managed resources. An example of such managerial task is the BESA agents enabled business processes with the ability of "sense-and-respond".

Agents in the strategic management layer enable BESA_R to maintain information about itself and use this information to remain extensible and adaptable. Strategic management layer performs meta-management directives unto the lower management layers. A meta-management directive is a higher sphere of control such as adapting the management commitments, modifying measurement and analysis algorithms in the operational management layer, or changing the alarm rules in the execution management layer.

With "smart distance" infrastructure operating within BESA_R, the enterprise can eliminate inefficiencies that are due to lags and latencies that exist in the traditional environment. In effect, BESA is able to sense and respond to market conditions quickly and effectively with the closed-loop control. Agents in the Execution layer can sense the salient information; agents and users in the operation layer can analyze the information from the lower layer into meaningful, quality business metrics. Users and agents in the strategy layer can respond by driving the execution of business decisions into the system through artifacts in the Operation and Execution layer.

Figure 21:
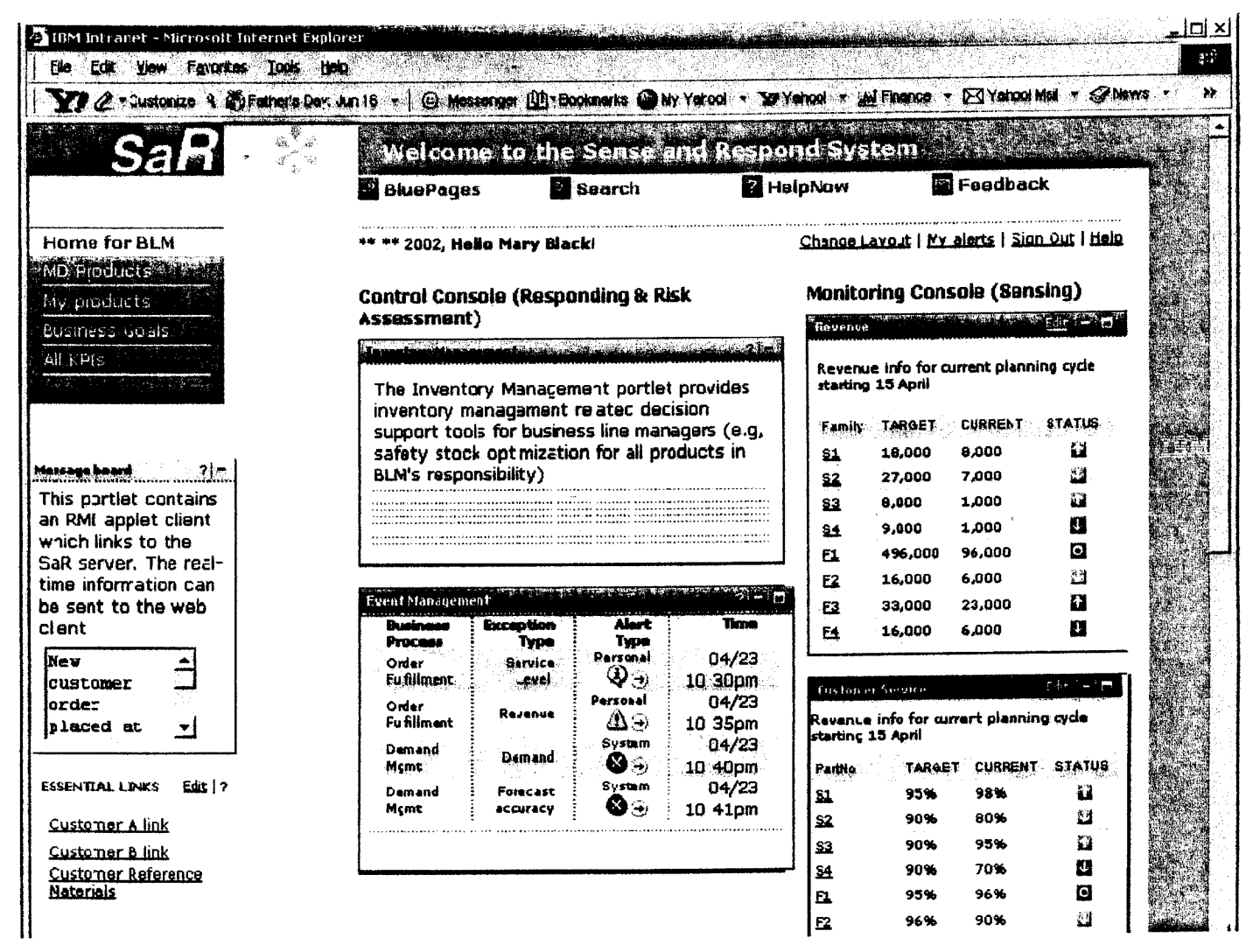

FIG. 21 shows an example of a portal 2100 of the "sense and respond" system that may be benefited from BESA agents. For example, the portal 2100 may be a user interface such as a display screen.

In short, an exemplary aspect of the present invention may utilize the concept of a smart distance for complex enterprise systems and illustrates the design of a generic agent architecture BESA that can enable smart distance for various agents within the systems. The invention further illustrates the possible applications of the design to "sense and response" systems. For example, with a "smart distance" and a three-layered closed-loop feedback control mechanism, the inventive system is able to sense and respond to the market quickly and effectively.

E-commerce systems are in an environment that is open, uncertain, dynamic and complex. It is open since the systems need to interact with highly diversified actors. It is uncertain since errors and unexpected scenarios can happen. It is dynamic since business processes and associated rules can be changed frequently. By nature, an e-commerce environment is complex in terms of diverse environments and changing business requirements. With "smart distance" among various actors, a complex system with BESA agents is able to eliminate inefficiencies that are due to lags and latencies that exist in the traditional environment.

Organizations and their staff play an important role in the E-Commerce environments. The whole process might be involved with many organizations such as suppliers, manufacturers, sales, and procurement personnel. Hence, it is natural to model the enterprise as societies of entities and to provide "smart distance" among these entities. These entities might be either cooperating with each other to solve complex problems (procurement and manufacturing), or else competing with each other (e.g. between different enterprises selling the same product). Hence, organizational structures are usually reflected in the architecture of E-Commerce systems. In the system discussed herein, such structures are represented by management pyramid.

E-Commerce systems contain many legacy systems. Such systems cannot be retired because of the immediate cost of re-development. And yet, they are often required to interact with other components in E-Commerce systems. A solution of BESA_R is to wrap the legacy systems with a standard interface, enabling them to communicate with other BESA agents for various purposes. For example, as revenue watchdog agents will be able to communicate with legacy systems and check whether the revenue is to be off the target. If so, it will notify the corresponding BLM agents and ask the agents to inform the corresponding delegates who are interested in such news.

Another exemplary aspect of the present invention includes a Smart Distance and Adaptive Virtual Enterprise Enabled Engineering and Construction (E&C) Resource Management System. This exemplary aspect of the present invention may concentrate on seamless decision control for resource acquisition/procurement and resource allocation/scheduling. This aspect may be especially useful, for example, in large-sized E&C companies with a number of parallel and geographically distributed projects in progress. In addition, this aspect may be used for optimal supply chain management that handles changes from various unexpected events, for distributed resource control/optimization at both individual project level and global level, and for risk management.

Key issues to be addressed in Engineering and Construction include key functionalities, such as delivering the right material to the right place at the right time, identifying critical resources and assure they are in place in time. This may include, for example, reducing material shortages and excesses during construction, and reducing surplus bulk materials costs. Such key functionalities may also include scheduling construction resources to reduce waiting time, identifying which materials should be stocked in inventory due to cost and criticality, and being able handle frequent unexpected events Key issues may further include other functionalities, such as controlling an adaptive supply chain across engineering, resource procurement/allocation and construction phases in a concurrent and distributed environment with various unexpected events. Such issues may further include receiving vendor documentation in a timely manner to meet the demands of the design and construction programs, and handling unique requirements such as long lead times of over a year.

This exemplary aspect of the present invention includes a virtual enterprise system that provides coordination/e-networking (through smart distance) among employees, partners, vendors, and customers for resource scheduling and acquisition, adaptive response under unpredictable environments, supply chain maximization, and electronic transferring of documents. The virtual enterprise system further provides project activity status, such as what should be ordered/received/updated, whether schedule is on/behind/ahead, whether budget is on/under, and disruption recovery status. The virtual enterprise system also provides distributed control of costs, resources, materials, documents, and schedules.

This exemplary aspect of the present invention provides several advantages over conventional systems. Such advantages include, for example, much tighter materials management and control of construction activities leading to a reduction in surplus materials and a better planning of activities, and a reduction in project cost and length.

Figure 22:
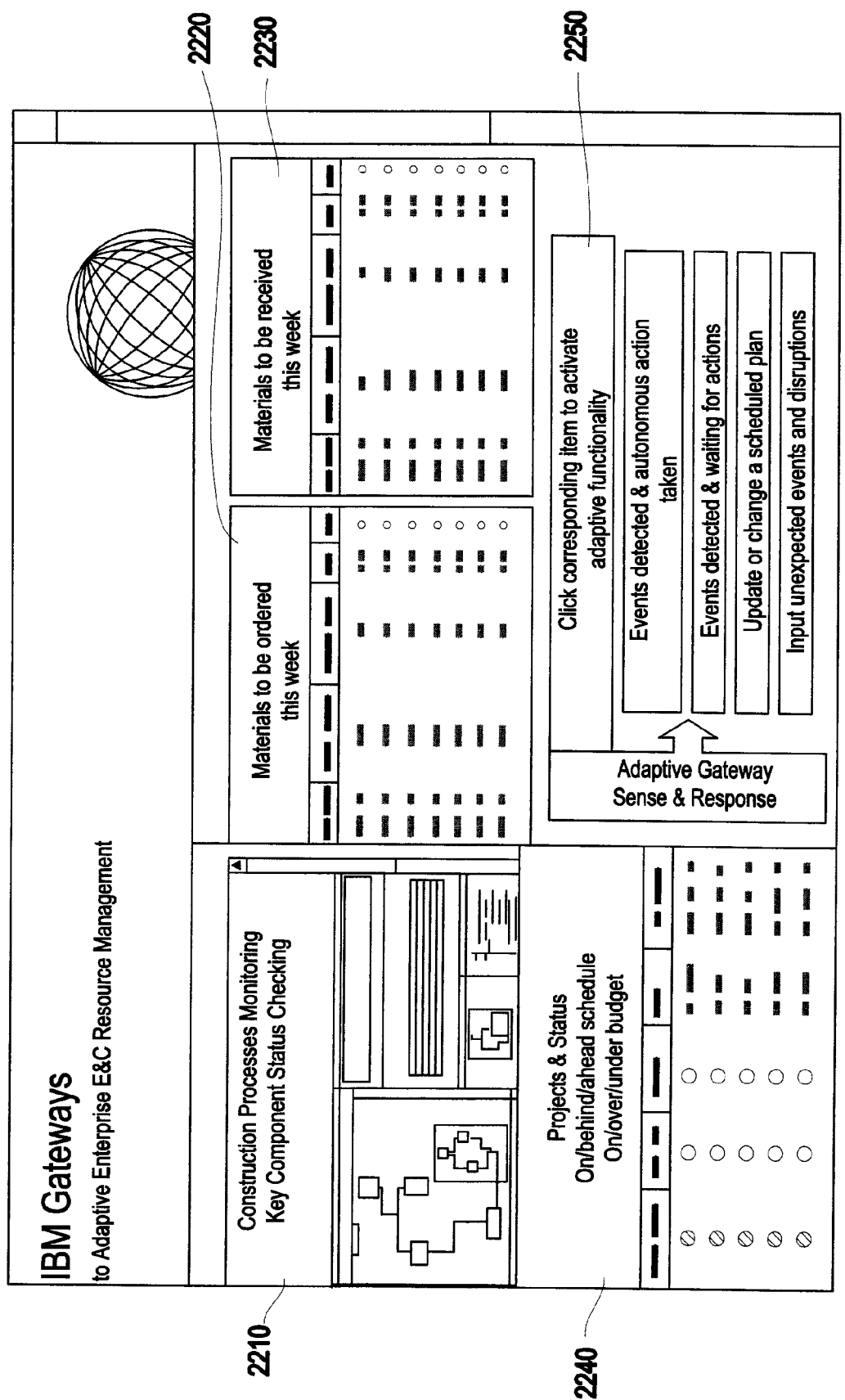
FIG. 22 illustrates a smart distance enabled view (e.g., display screen) 2200 in a smart distance and adaptive virtual enterprise enabled engineering and construction (E & C) resource management system, according to an exemplary aspect of the present invention.

For example, as illustrated in FIG. 22, this aspect of the present invention may include a smart distance enabled view (e.g., display screen) 2200 for a project manager. As illustrated in FIG. 22, the exemplary view 2200 may include an area 2210 for displaying construction processes monitoring and key component status checking, an area 2220 for displaying materials to be ordered this week, an area 2230 for displaying materials to be received this week, an area 2240 for displaying projects and status, such as whether the project is on/behind/ahead of schedule and whether the project is on/over/under budget, and an area 2250 for displaying an adaptive gateway for sense and response, in which the user may click on a corresponding item to activate an adaptive functionality.

Figure 23:
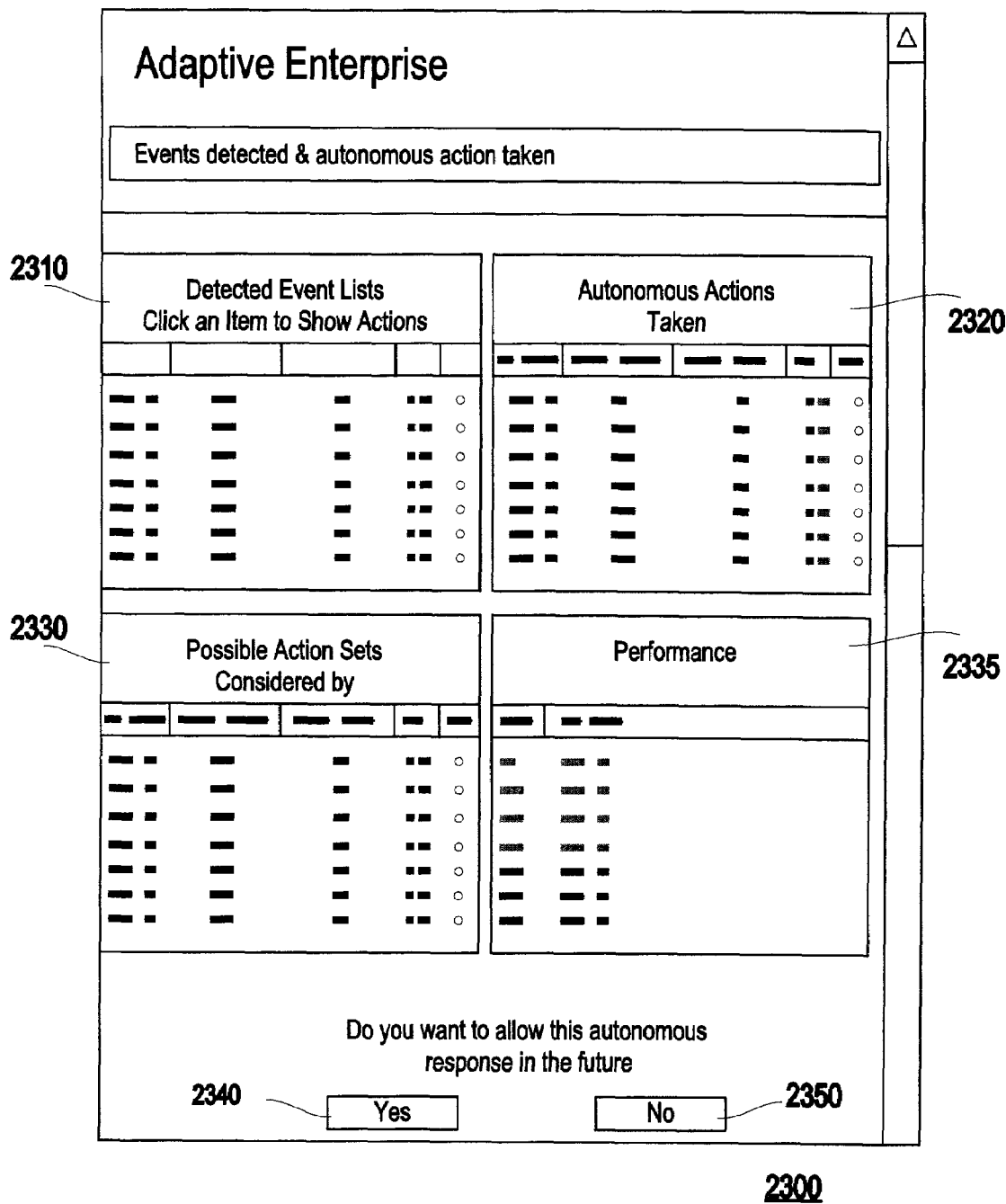
FIG. 23 illustrates an "events detected and autonomous action" display screen 2300, according to an exemplary aspect of the present invention.

For example, as illustrated in FIG. 23, if a user clicks in area 2250 on events detected and autonomous action taken, the inventive system may cause the "events detected and autonomous action" display screen 2300 to be displayed. This may be used, for example, in situations where the enterprise can correctly choose responses.

For example, the display screen 2300 may include an area 2310 for displaying detected event lists. This area 2310 shows events that have been detected by the Adaptive Enterprise. Further, when clicking an event item in area 2310, the "Autonomous Actions Taken" and "Possible Action Sets Considered" will be listed.

The display screen 2300 may also include an area 2320 for displaying autonomous actions taken. This area 2320 may list the autonomous actions taken with respect to selected event Further, an area 2330 for displaying possible actions sets considered may also be included. For example, for a given event, there may be many ways of responding. The Adaptive Enterprise may consider the listed possible actions, and select the one with the best performance to execute. In addition, an area 2335 for displaying a job performance may also be included in the display screen 2300.

An area which allows the user to select whether he wants to allow a certain (e.g., selected) autonomous response in the future. Thus, for example, if the project manager is satisfied with the autonomous response, he may click on a "Yes" button 2340, so that in the future this autonomous adaptivity is taken. Alternatively, the manager may click on a "No" button 2350.

For example, assuming that during the construction of a building, the materials for painting should be in storage on June 1, since the basic construction is supposed to finish on May 30, and the painting should start on June 1. However, for some reason, the construction is delayed for about one month. This event may be detected by the enterprise and informed through smart distance module, which considers the price change over time for painting materials, the availability/cost of storage, and various other factors. In this example, the adaptive enterprise may develop many alternative responses. It evaluates these alternatives and selects the one that is the best according to its inference engine.

Figure 24:
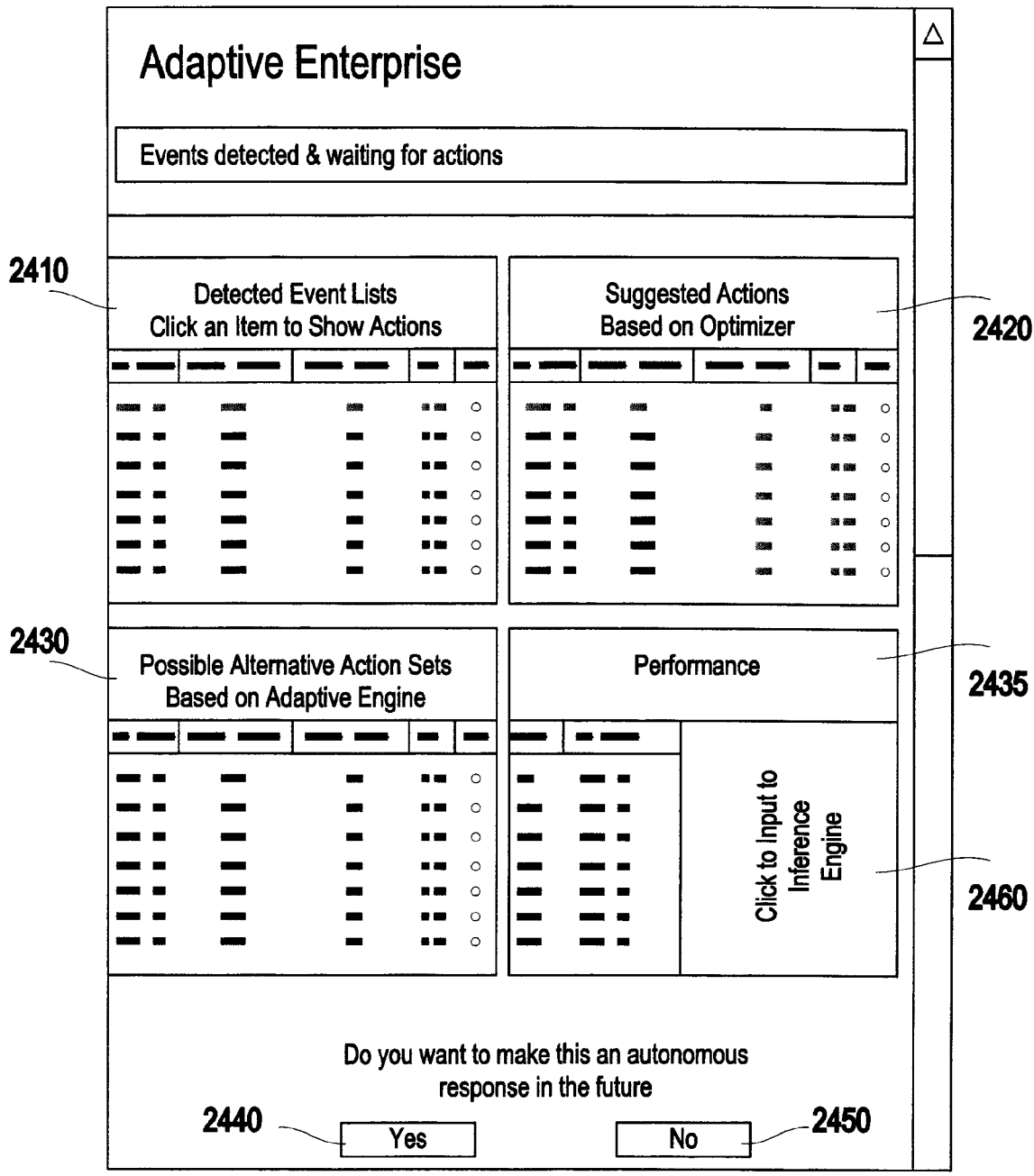
FIG. 24 illustrates an "events detected and waiting for actions" display screen 2400, according to an exemplary aspect of the present invention.

Further, as illustrated in FIG. 24, if a user clicks in area 2250 on events detected and waiting for actions, the inventive system may cause the "events detected and waiting for actions" display screen 2400 to be displayed. This may be used, for example, in situations where the enterprise was not able to correctly choose a response.

Specifically, the enterprise may detect events, propose its suggestions and wait for the project manager's approval or suggestions on different actions. This is determined by the smart distance module.

Specifically, the display screen 2400 may include an area 2410 for displaying detected event lists. When an item is clicked, suggested actions and alternative sets are displayed. This may be determined by the smart distance module to display the information to the user.

An area 2420 for displaying suggested actions based on an optimizer may also be included. The optimizer chooses a best action set based on its inference engine. This is also determined from the smart distance module.

The display screen 2400 may also include an area 2430 for displaying possible alternative action sets based on an adaptive engine. In addition, an area 2435 for displaying a job performance may also be included in the display screen 2400.

The display screen 2400 may include an area which allows the user to select whether he wants to allow a certain (e.g., selected) autonomous response in the future. Thus, for example, if the project manager is satisfied with the autonomous response, he may click on a "Yes" button 2440, so in the future this autonomous adaptivity is taken. Alternatively, the manager may click on a "No" button 2450.

In addition, the display screen 2400 may include an input area 2460 on which the user may click to input data to an inference engine. For example, the user can check how well the autonomous analysis is and may want to modify the inference engine so that it can perform better in the future. This is realized by the smart distance module to modify the smart distance configurations.

Figure 25:
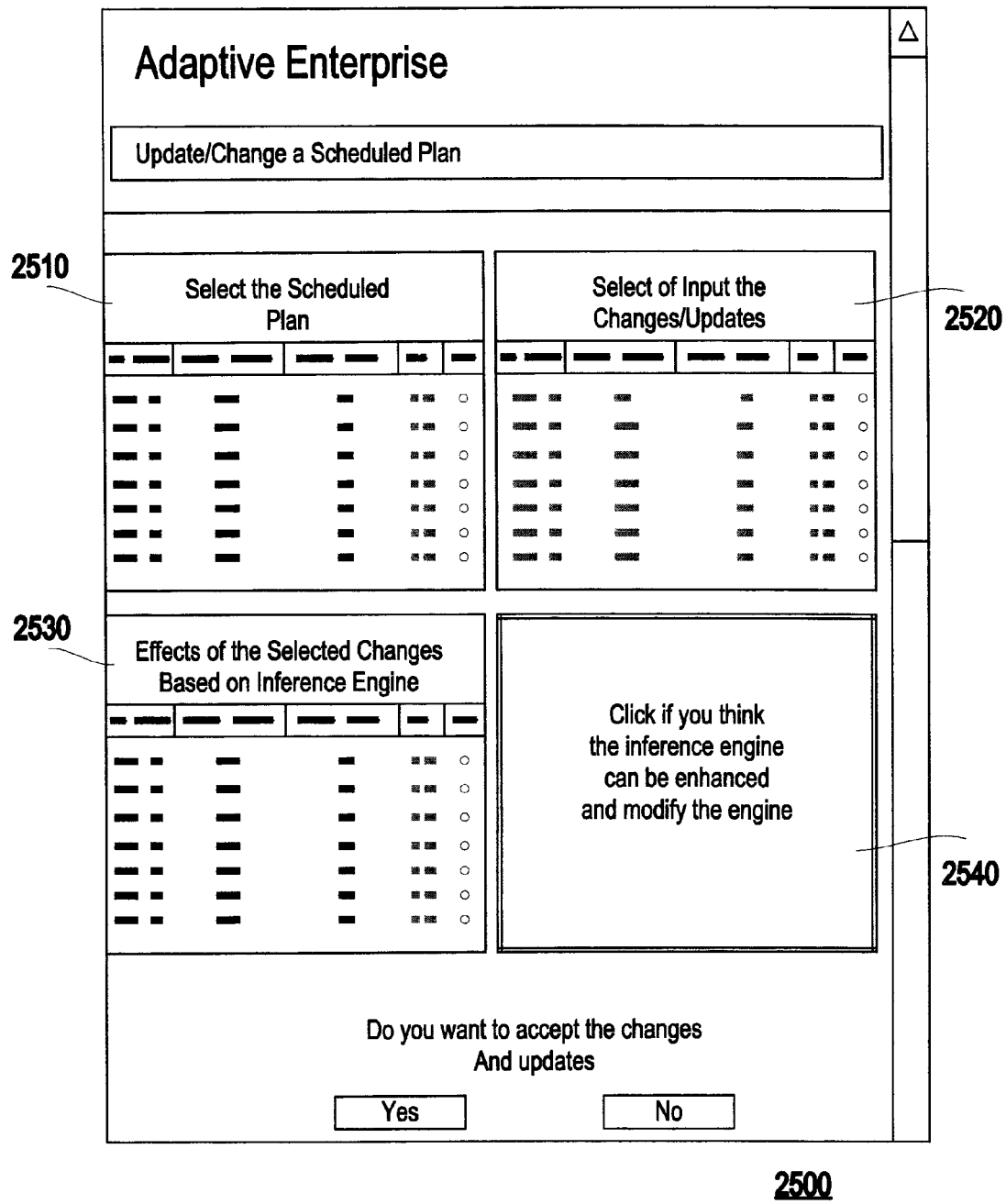
FIG. 25 illustrates an "update or change a scheduled plan" display screen 2500 according to an exemplary aspect of the present invention.

Further, as illustrated in FIG. 25, if a user clicks in area 2250 on update or change a scheduled plan, the inventive system may cause the "update or change a scheduled plan" display screen 2500 to be displayed. This may be used, for example, to allow the enterprise to help the project managers in decision making.

In particular, the display screen 2500 may be used when the project manager wants to change or update the scheduled plan. The display of this screen is realized by the smart distance module.

For example, the display screen 2500 may include an area 2510 for displaying information on scheduled plans. A user (e.g., project manager) may use this area 2510 to select the plan to be updated.

The display screen 2500 may also include an area 2520 for displaying information on changes or updates. A user (e.g., project manager) may use this area 2520 to select or input the changes to the plan. The display screen 2500 may also include an area 2530 for displaying the effects of the selected changes based on the inference engine.

Further, there might exist some situations where the suggested effects by the Enterprise are not correct/complete. The project manager might be able to enhance the inference engine. Thus, the display screen 2500 may include an area 2540 on which the user (e.g., project manager) may click to modify the engine (e.g., if he thinks that the inference engine can be enhanced). The display screen 2500 may also include an area which allows the user to select whether he wants to allow a certain (e.g., selected) autonomous response in the future.

Figure 26:
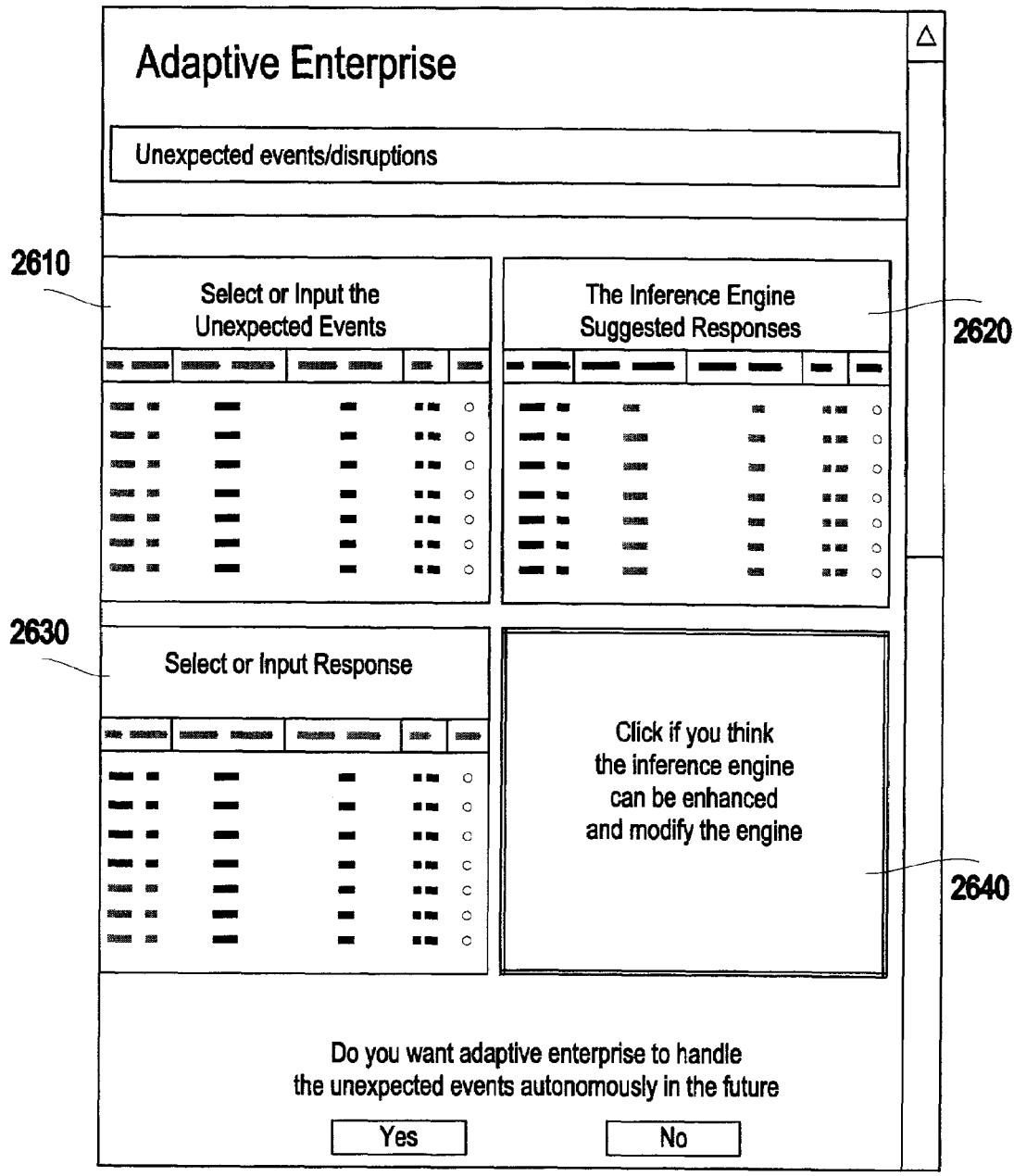
FIG. 26 illustrates an "input unexpected events/disruptions" display screen 2600 according to an exemplary aspect of the present invention.

Further, as illustrated in FIG. 26, if a user clicks in area 2250 on input unexpected events/disruptions (e.g., a "worst case(s) scenario"), the inventive system may cause the "input unexpected events/disruptions" display screen 2600 to be displayed. This may be used, for example, to allow the enterprise to help the project managers in determining how the enterprise should respond.

In particular, this display screen 2600 may be helpful in a situation where unexpected events happen. Smart distance module determines which events to be listed and the suggested actions.

Specifically, the display screen 2600 may include an area 2610 for displaying information on the unexpected events. The user (e.g., project manager) may use this area to select the unexpected events from a list, or, if the list does not contain the events, he can input the events.

The display screen 2600 may also include an area 2620 for displaying information on suggested responses. This area may include, for example, a set of responses suggested by the inference engine. The display screen 2600 may also include an area 2630 for allowing the user (e.g., project manager) to select the responses from the engine, or analyze the events and propose his own responses. Thus, if the user believes that the inference engine can do a good job, he may assign it the authority so that the virtual enterprise can respond (e.g., automatically respond) in the future.

The display screen 2600 may include an area 2640 on which the user (e.g., project manager) may click to modify the engine (e.g., if he thinks that the inference engine can be enhanced). The display screen 2500 may also include an area which allows the user to select whether he wants to allow a certain (e.g., selected) autonomous response in the future.

Figure 27:
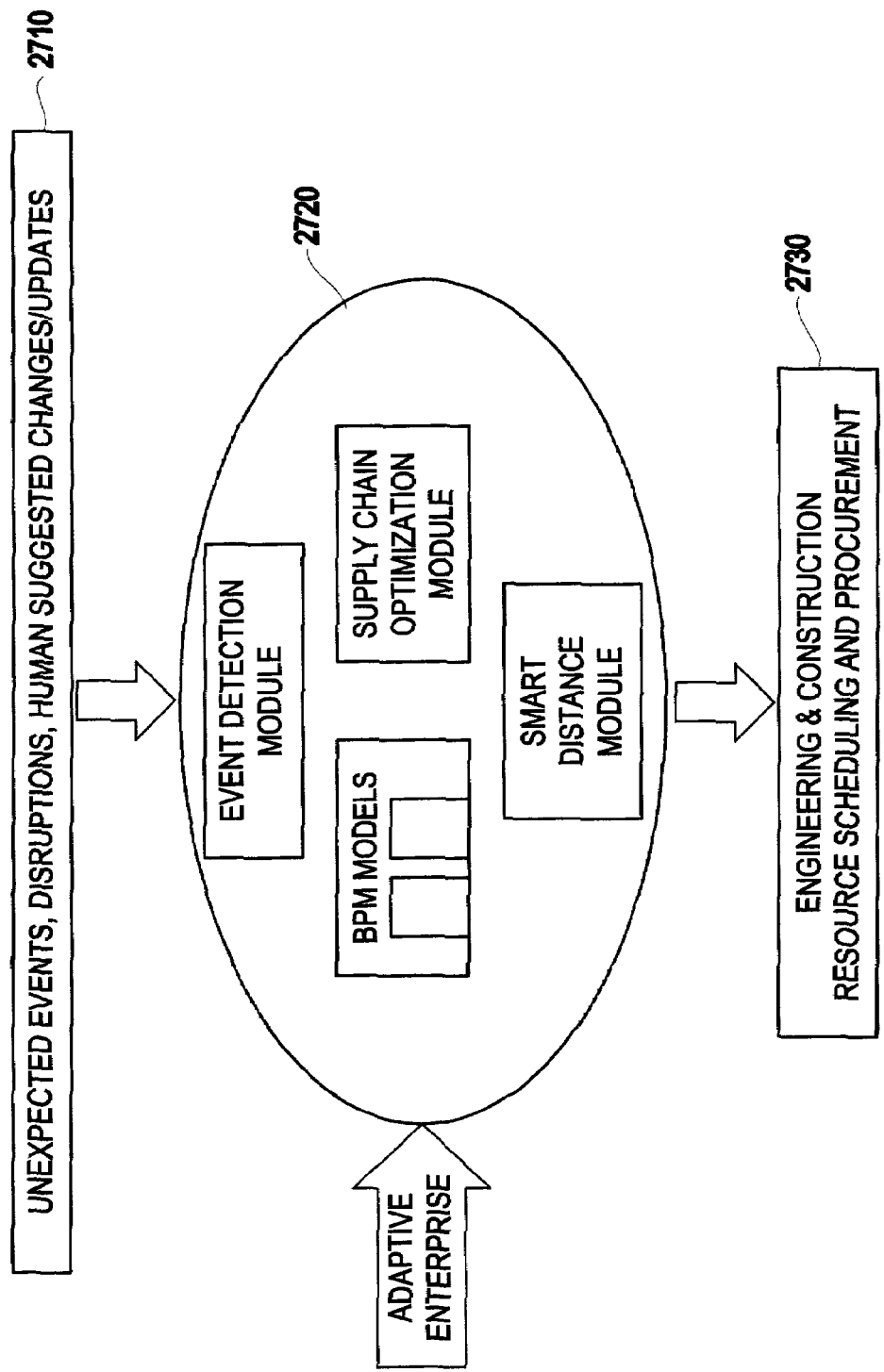
FIG. 27 illustrates an exemplary flowchart which describes a basic structure of the enabling technologies, according to an exemplary aspect of the present invention.

FIG. 27 illustrates an exemplary flowchart which describes a basic structure of the enabling technologies for this exemplary aspect of the present invention. As shown in FIG. 27, information 2710 including unexpected events, disruptions, human suggested changes/updates may be provided (e.g., input) to the present invention which includes an adaptive enterprise system 2720. For example, the adaptive enterprise system 2720 may include an event detection module, a supply chain optimization module, models generated from business process modeling (BPM) and a smart distance module. Thus, the adaptive enterprise system 2720 may use the information 2710 to generate data for engineering and construction resource scheduling and procurement.

This exemplary aspect of the present invention may be used to address key issues in the engineering and construction industry. For example, the invention may be used to deliver the right material to the right place at the right time. Specifically, the invention may identify critical resources and assure they are in place in time, and may consider factors, such as lead time plus 1 year, which material should be in stock, etc.

The invention may also be used to receive vendor documentation in a timely manner to meet the demands of the design and construction programs, reduce material shortages and excesses during construction, improve management monitoring of projects and information, improve productivity and supply chain management, and effectively control a supply chain across engineering, procurement and construction phases in a concurrent and distributed environment.

The invention may also be used to measure progress and control cost, requisition and purchase material, reduce surplus bulk materials costs, schedule construction resources to eliminate waiting time, identify plan and control project deliverables, identify and access information in a timely manner, and change control. The enabling technology of the present invention may include, for example, business process modeling supply chain maximization, unexpected events and response for adaptivity, smart distance with Adoc, agent technologies (e.g., decision support optimization), and multi-agent distributed control.

Figure 28:
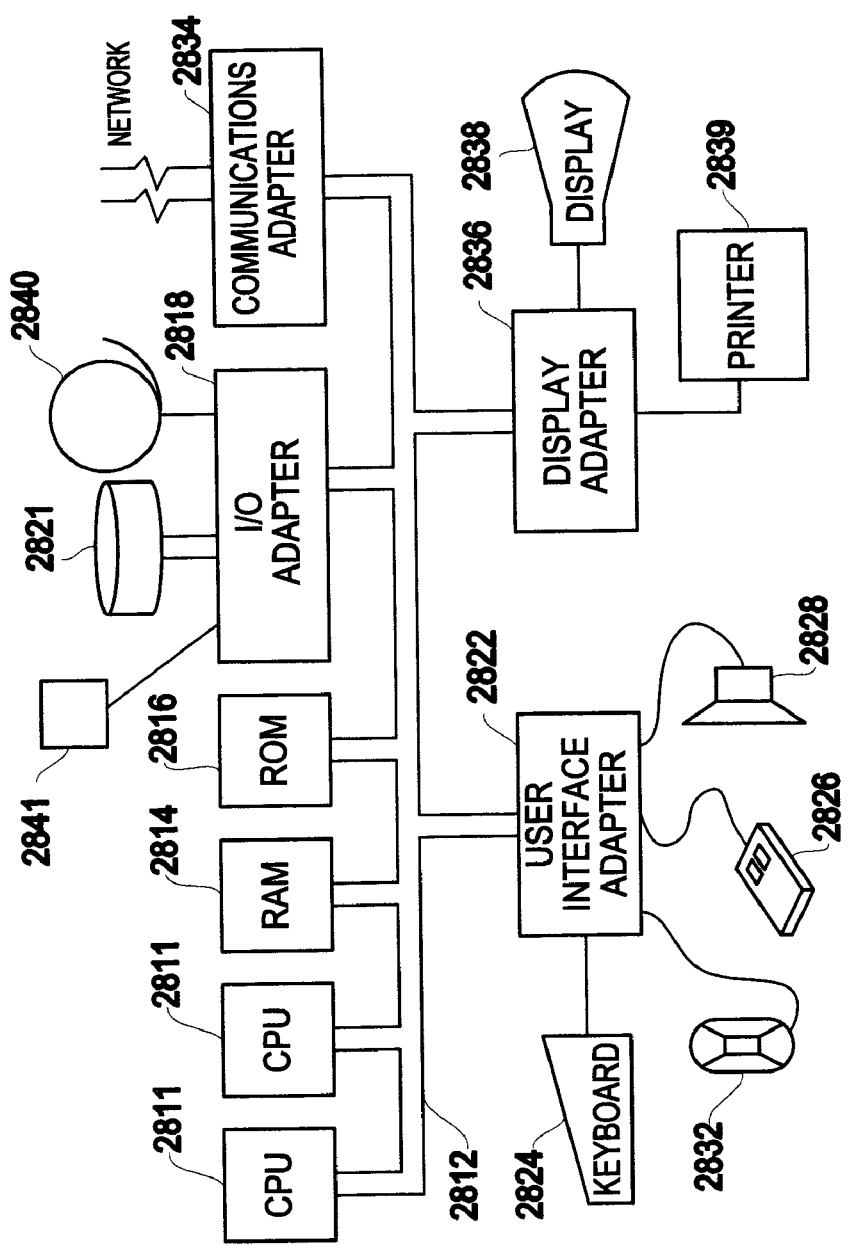
FIG. 28 illustrates a system 2800 which is a typical hardware configuration which may be used for implementing the inventive system and method.

Referring now to FIG. 28, system 2800 illustrates a typical hardware configuration which may be used for implementing the inventive system and method. The configuration has preferably at least one processor or central processing unit (CPU) 2811. The CPUs 2811 are interconnected via a system bus 2812 to a random access memory (RAM) 2814, read-only memory (ROM) 2816, input/output (I/O) adapter 2818 (for connecting peripheral devices such as disk units 2821 and tape drives 2840 to the bus 2812), user interface adapter 2822 (for connecting a keyboard 2824, mouse 2826, speaker 2828, microphone 2832, and/or other user interface device to the bus 2812), a communication adapter 2834 for connecting an information handling system to a data processing network, the Internet, and Intranet, a personal area network (PAN), etc., and a display adapter 2836 for connecting the bus 2812 to a display device 2838 and/or printer 2839. Further, an automated reader/scanner 2841 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 2811 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 2811 and hardware above, to perform the method of the invention.

Figure 29:
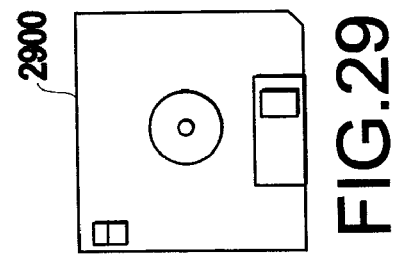
FIG. 29 illustrates a programmable storage medium 2900 (e.g., floppy disk) tangibly embodying a program of machine-readable instructions executable by a digital processing apparatus to perform the inventive method.

This signal-bearing media may include, for example, a RAM contained within the CPU 2811, as represented by the fast-access storage for example. Alternatively, the instructions may be contained in another signal-bearing media, such as a magnetic data storage diskette 2900 (FIG. 29), directly or indirectly accessible by the CPU 2811.

Whether contained in the computer server/CPU 2811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as C, C+, C++, etc.

With its unique and novel features, the present invention provides an enterprise system having a distance between artifacts which allows the performance of the system to be optimized (e.g., maximized).

While the invention has been described in terms of one or more exemplary embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements, and no amendment to any claim the present application should be construed as a disclaimer of any interest in or right to an equivalent of any element or feature of the amended claim.

What is claimed is:

1. An enterprise system, comprising:
    a server which enables communication, awareness and interaction between a plurality of artifacts; and
    a calculator for calculating a smart distance between said plurality of artifacts according to a predetermined algorithm, said smart distance comprising an optimal degree of communication, awareness and interaction between said plurality of artifacts,
    wherein said plurality of artifacts comprise at least one of an enterprise user, a business entity agent and a business object.

2. The enterprise system according to claim 1, wherein said enterprise system comprises a virtual enterprise system.

3. The enterprise system according to claim 1, wherein a plurality of interactions are formed between artifacts in said plurality of artifacts, said interactions comprising at least one of a video channel, an audio channel and a text channel.

4. The enterprise system according to claim 1, wherein said predetermined algorithm comprises:
    representing a distance from $a_i$ to $a_j$ as a vector $d_{ij} = \langle |c_1|, \ldots, |c_{I_{ij}}| \rangle$;
    representing the distance configurations at time $\tau$ for a given enterprise by a $$\text{matrix } D(\tau) = \begin{pmatrix} d_{11}(\tau), \ldots, d_{1n}(\tau) \\ \cdots \\ d_{n1}(\tau), \ldots, d_{nn}(\tau) \end{pmatrix};$$

and
    minimizing $\|D(\tau) - D_{natural}(\Omega(\tau))\|$,
    wherein an interaction between said artifacts comprises channels $c_1, \ldots, c_{I_{ij}}$, $|c_{I_{ij}}|$ comprises a degree of interaction for a channel $c_{I_{ij}}$, $\Omega(\tau)$ comprises a given contextual/environmental condition at time $\tau$, and $D_{natural}(\Omega(\tau))$ comprises a natural distance configuration.

5. The enterprise system according to claim 1, wherein said plurality of artifacts comprises a plurality of adaptive documents.

6. The enterprise system according to claim 5, wherein said smart distance comprises a distance between said an adaptive document in said plurality of adaptive documents and one of a person, an agent, and another adaptive document in said plurality of adaptive documents.

7. The enterprise system according to claim 5, wherein said plurality of adaptive documents comprises a local registry.

8. The enterprise system according to claim 7, wherein said server comprises a global awareness server, and
    wherein said adaptive document interacts with other artifacts via said global awareness server.

9. A method for providing a smart distance among artifacts of an enterprise system, comprising:
    in a server, enabling communication, awareness and interaction between a plurality of artifacts; and
    in a calculator, calculating a smart distance between said plurality of artifacts according to a predetermined algorithm, said smart distance comprising an optimal degree of communication, awareness and interaction between said plurality of artifacts,
    wherein said plurality of artifacts comprise at least one of enterprise users, business entity agents and business objects.

10. The method according to claim 9, wherein said calculating said smart distance comprises:
    representing a distance from $a_i$ to $a_j$ as a vector $d_{ij} = \langle |c_1|, \ldots, |c_{I_{ij}}| \rangle$;
    representing the distance configurations at time $\tau$ for a given enterprise by a $$\text{matrix } D(\tau) = \begin{pmatrix} d_{11}(\tau), \ldots, d_{1n}(\tau) \\ \cdots \\ d_{n1}(\tau), \ldots, d_{nn}(\tau) \end{pmatrix};$$

and
minimizing $\|D(\tau) - D_{natural}(\Omega(\tau))\|$,
    wherein an interaction between said artifacts comprises channels $c_1, \ldots c_{I_{ij}}$, $|c_{I_{ij}}|$ comprises a degree of interaction for channel $c_{I_{ij}}$, $\Omega(\tau)$ comprises a given contextual/environmental condition at time $\tau$, and $D_{natural}(\Omega(\tau))$ comprises a natural distance configuration.

11. A virtual enterprise system, comprising:
    a server which enables communication, awareness and interaction between a plurality of artifacts; and
    at least one processing device for determining a smart distance between said plurality of artifacts using contextual information and a smart distance preference, said smart distance being determined relative to other smart distances between artifacts in said enterprise system, said smart distance comprising an optimal degree of communication, awareness and interaction between said plurality of artifacts, wherein said plurality of artifacts comprise at least one of an enterprise user, a business entity agent and a business object.

12. The virtual enterprise system according to claim 11, further comprising:

a state machine operatively coupled to said at least one processing device, for capturing said contextual information; and a local registry, operatively coupled to said at least one processing device, for recording said smart distance preference.

13. The virtual enterprise system according to claim 11, wherein said virtual enterprise system comprises an engineering and construction (E&C) resource management system, which controls resource acquisition and procurement and resource allocation and scheduling, optimally manages a supply chain including changes from various unexpected events, controls and optimizes distributed resources at both individual project level and global level, and manages risk.

14. The virtual enterprise system according to claim 11, wherein said smart distance comprises a distance between employees, partners, vendors, and customers in said virtual enterprise system.

15. The virtual enterprise system according to claim 11, further comprising:

a graphical user interface for displaying a smart distance enabled view.

16. The virtual enterprise system according to claim 15, wherein said smart distance enabled view comprises:

an area for displaying construction processes monitoring and key component status checking;

an area for displaying materials to be ordered this week, an area for displaying materials to be received this week, an area for displaying projects and status, such as whether the project is on schedule, behind schedule, or ahead of schedule and whether the project is on budget, over budget, or under budget; and an area for displaying an adaptive gateway for sense and response, in which the user may click on a corresponding item to activate an adaptive functionality.

17. The virtual enterprise system according to claim 16, wherein a user clicks on said area for displaying said adaptive gateway to generate at least one of an events detected and autonomous action display screen, events detected and waiting for actions display screen, update or change a scheduled plan display screen, and an input unexpected events or disruptions display screen.

* * * * *